United States Patent
Herrmann

(10) Patent No.: US 10,240,528 B2
(45) Date of Patent: Mar. 26, 2019

(54) FILTRATION SYSTEM AND METHOD FOR CLEANING THE INTAKE AIR OF A GAS TURBINE

(71) Applicant: Torsten Herrmann, Munich (DE)

(72) Inventor: Torsten Herrmann, Munich (DE)

(73) Assignee: Torsten Herrmann (DE)

(*) Notice: Subject to any disclaimer, the term of this patent is extended or adjusted under 35 U.S.C. 154(b) by 376 days.

(21) Appl. No.: 14/895,376

(22) PCT Filed: May 27, 2014

(86) PCT No.: PCT/IB2014/001247
§ 371 (c)(1),
(2) Date: Dec. 2, 2015

(87) PCT Pub. No.: WO2014/195796
PCT Pub. Date: Dec. 11, 2014

(65) Prior Publication Data
US 2016/0131033 A1    May 12, 2016

(30) Foreign Application Priority Data
Jun. 4, 2013  (DE) .................... 10 2013 105 723

(51) Int. Cl.
*F02C 7/05* (2006.01)
*B01D 46/12* (2006.01)
(Continued)

(52) U.S. Cl.
CPC ............ *F02C 7/052* (2013.01); *B01D 46/002* (2013.01); *B01D 46/0005* (2013.01);
(Continued)

(58) Field of Classification Search
CPC ............ B01D 46/0005; B01D 46/002; B01D 46/023; B01D 46/12; B01D 46/125; B01D 2279/60; F02C 7/052; F05D 2260/607
See application file for complete search history.

(56) References Cited

U.S. PATENT DOCUMENTS

2011/0290116 A1* 12/2011 Jarrier ................ B01D 46/0013
                                                            95/280

FOREIGN PATENT DOCUMENTS

DE    10 2008 037 503      5/2009
EP    1 674 144              6/2006
(Continued)

OTHER PUBLICATIONS

International Search Report.
German Office Action dated Jun. 23, 2015.

*Primary Examiner* — Robert Clemente
(74) *Attorney, Agent, or Firm* — Gerald E. Hespos; Michael J. Porco; Matthew T. Hespos

(57) ABSTRACT

In a filtration system, in particular for cleaning the intake air of a gas turbine, including a flow channel surrounded by walls with an inflow opening and an outflow opening, a partition wall with at least two openings between a dirty side and a clean side which is positioned between the inflow opening and the outflow opening and limited by the walls of the flow channel, and at least two filters for purifying a flowing fluid. At least one filter is installed at a first opening on the dirty side of the partition wall and at least one filter at a second opening on the clean side of the partition wall.

6 Claims, 15 Drawing Sheets

(51) Int. Cl.
*F02C 7/052* (2006.01)
*B01D 46/00* (2006.01)
*B01D 46/02* (2006.01)

(52) U.S. Cl.
CPC .......... *B01D 46/023* (2013.01); *B01D 46/12* (2013.01); *B01D 46/125* (2013.01); *B01D 2279/60* (2013.01); *F05D 2210/12* (2013.01); *F05D 2220/32* (2013.01); *F05D 2260/607* (2013.01); *Y02T 50/671* (2013.01)

(56) References Cited

FOREIGN PATENT DOCUMENTS

| EP | 2 246 106 | 11/2010 |
| WO | 2012/164087 | 12/2012 |

\* cited by examiner

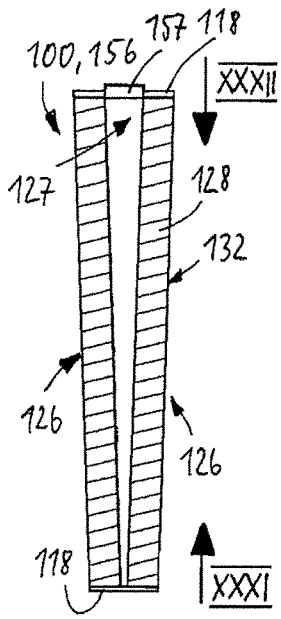
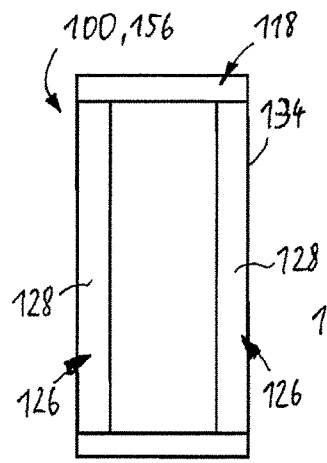
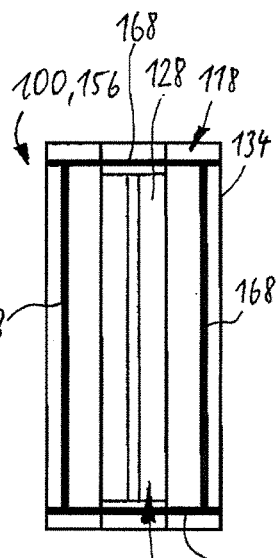
Fig. 30  Fig. 31  Fig. 32
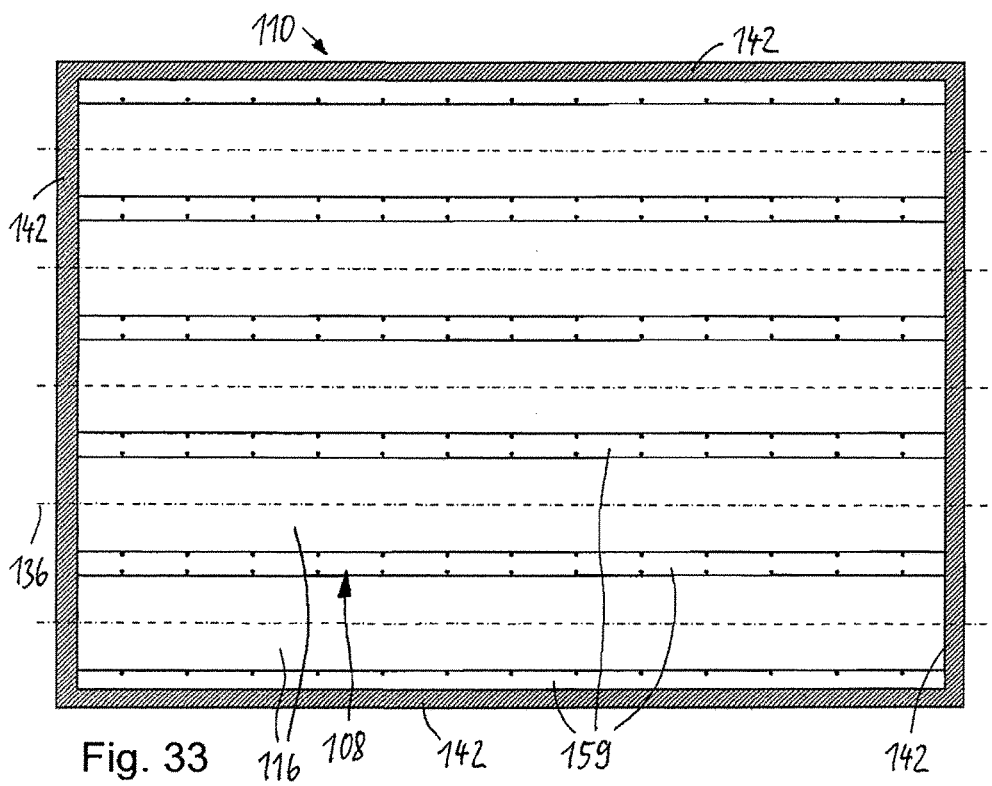
Fig. 33

FILTRATION SYSTEM AND METHOD FOR CLEANING THE INTAKE AIR OF A GAS TURBINE

BACKGROUND

1. Field of the Invention

The invention relates to filtration in general and in particular to an improved apparatus and method for cleaning the intake air to be used in a gas turbine.

2. Description of the Related Art

A gas turbine typically requires large quantities of intake air for the combustion of fuel. The natural pollution of the surrounding air results in a considerable impairment of the turbine performance. For example, particles from the air deposit on the compressor blades of the gas turbine and lead to an imbalance or effect a change in the flow profile of the compressor blades. Salt crystals or salt aerosols contained in the air lead to corrosion in the gas turbine, in particular on the turbine blades. These and other mechanisms lead to a strong reduction of the turbine performance and energy efficiency. For this reason, the intake air is filtered to remove as much of the undesired contaminants as possible. Usually this is done by a larger number of filters which are located in a filter house. The filter house is connected to the gas turbine via a flow channel through which the purified air is fed to the gas turbine.

The filters are attached to at least one filter wall which constitutes within the filter house the partition of a relative raw gas area and a relative clean gas area in relation to the respective filter wall. The filter can also be called a matrix. The filter wall is sealingly connected to the walls of the filter house and is limited by them with regard to its height and width. The filter wall has openings through which the air exchange between the raw gas and the clean gas side can take place. The filters are installed in front of or in these openings.

The filters can have different designs. For example, filter cartridges, pocket filters and cartridge filters in all different embodiments are used. It is also not uncommon that several filter walls are positioned one behind the other in a series connection whereby the filter class and the separation efficiency of the filter is generally chosen in such a way that it increases from the first to the last filter wall. The filter wall positioned on the inlet side thus functions as a pre-filtration of the air for the subsequent filtration stages.

All current filtration systems have in common that the individual filters are only installed on one side of the partition wall. Usually this is the respective raw gas or dirty side of the filter walls. It is commonly considered advantageous to also deinstall the loaded filters at a standstill of the gas turbine from the raw gas side so that any contaminants coming lose from the filters cannot penetrate the clean gas area. The filters of the last filter stage in the flow direction, however, are always installed on the clean gas side of the filter wall.

Gas turbines are also used on offshore oil and gas production platforms. They are used to generate electricity for operating the platform or pumping and compressing, respectively, the produced oil and gas. Due to the confined space and the weight limitations of the platform structures, the filter houses are being built smaller and more compact as is usual in comparison to onshore installations. Due to the smaller dimensions of the filter houses, the dimensions of the filter walls are consequently also smaller and typically significantly fewer filters are installed as would be usual with the same turbine model onshore. Conversely, this means that the filters are operated with a considerably higher volume flow of the air to be filtered than onshore as the total volume flow is determined by the gas turbine. Accordingly, gas turbines operated offshore usually have a volume flow of approx. 7000 to over 8000 m3/h per filter whereas gas turbines operated onshore usually have a volume flow of 3400 to 4300 m3/h.

With regard to gas turbines operated onshore, there has been a trend to a higher-value filtration in recent years. In particular, the use of EPA or HEPA filters according to EN1822:2009 has proven to be advantageous as the effect on the energy efficiency of the gas turbine over the service life of the filter is very positive. An improvement of the filter medium's filtration efficiency, however, in general also increases its differential pressure. The differential pressure of a new filter is thus inter alia a function of the filter medium and the volume flow applied. As the maximum differential pressure of a filter house or the gas turbine itself is limited, a predetermined number of filters installed results in a limitation of the filter class. Due to the high volume flow of offshore gas turbines, filters according to EN779:2012 or equivalent are almost exclusively used. Higher-value filters according to EN1822:2009 or equivalent have not yet become prevalent although their positive effect on turbine efficiency would be desirable. In case of land-based gas turbines, it is possible to reduce the volume flow per filter by enlarging the filter house and consequently increasing the number of filters. In case of offshore installations, however, this is not possible in most of the cases. The installation space, in particular with regard to existing platforms, is simply limited. For example the height of each deck on an offshore platform is fixed and a filter house cannot be expanded across several decks. Multiple processes are tightly packed together with piping and cable ducts filling up most of the space in-between. Increasing the space of a filter house would therefore require a complete redesign and re-arrangement of multiple processes and would be a major undertaking, if not even impossible.

Another problem is the service live of filters. This is also a function of the volume flow in relation to the total deployed media area of a particular grade within a filter house. A longer service life of the filters is desirable in that it extends the intervals in which the filters have to be exchanged and thus increases the availability of the gas turbine. In the early phase of the filter life, the filter differential pressure changes little in response to rapidly changing environmental conditions, but towards the end of the filter life a relatively small change in e.g. humidity will result in a large and rapid increase in the differential pressure of the filter, which can trigger the alarm or trip limit of the turbine, leading to an unexpected shut down of the whole system. It is therefore desirable to change the filters before they enter the unstable condition and to avoid unexpected shut downs. Longer filter life not only reduces the ratio of unstable to stable operating condition of the filters, it also allows for a filter change before the unstable phase is entered. Thus the filter system will deliver better process reliability by increasing the deployed filter media area.

The invention has for its object to increase the number of filters in parallel order on a partition wall within a flow channel without having to enlarge the dimensions or cross section of the flow channel or partition wall.

SUMMARY

The invention comprises a filtration system, in particular for cleaning the intake air of a gas turbine, including a flow channel surrounded by walls with an inflow opening and an outflow opening, a partition wall with at least two openings which is positioned between the inflow opening and the outflow opening and limited by the walls of the flow channel, and at least two filters or filter elements for purifying a fluid flowing through the fluid channel, whereby at least one filter is installed at a first opening on the dirty/inlet side of the partition wall and at least one filter at a second opening on the clean/outlet side of the partition wall.

The flow channel has the purpose of leading a fluid flow, in particular a gas or air flow including tiny little particles such as dust, powder or salt spray, from the inflow opening to the outflow opening. It has walls which separate the fluid flow from the surrounding medium outside of the flow channel, usually ambient air, and prevent a mixing with the latter. The fluid to be purified enters the flow channel through the inflow opening under pressure and leaves it through the outflow opening. The outflow opening of the flow channel is usually connected to a consumer, in particular a gas turbine, which is fed with the fluid flow. Inside the flow channel, a partition wall is positioned largely transversely to the fluid flow and is completely fluid-tightly connected to the walls of the flow channel, thus providing a partition plane within the flow channel transverse to the direction of the fluid flow. By this arrangement, the fluid flow is led through the opening in the partition wall and the filters attached to it, respectively. The fluid flow is thereby purified. The partition wall thus constitutes a separation between a relative dirty side and a relative clean side of the flow channel as the filters reduce the number of particles contained in the fluid flow.

According to the teaching of the invention, at said partition wall a first sort or type of filters, each of which filters constituting one single mounting unit, is attached so as to extend basically at the dirty side of the flow channel. Further, a second sort or type of filters, again each of which constituting one single mounting unit, is attached at said partition wall so as to extend basically at the clean side of the flow channel.

The invention is based on the recognition that, as a result of installing the filters on one single side of a filter wall, these filters must be placed side by side. The external dimensions of the filters, in particular their width and height, thus determine the maximum number of filters which can be installed on a filter wall of a certain width and height. With the solution according to the invention, there is no such limitation.

Mounting of the filters can be made for the first filter from the dirty/inlet side and for the second filter from the clean/outlet side of the flow channel. Alternatively, mounting of the filters can be made for the first filter from the dirty/inlet side and for the second filter from the dirty/inlet side of the flow channel, too. During such alternative mounting process the second filter just has to be moved from the dirty/inlet side of the flow channel trough the second opening to the clean/outlet side of the flow channel. By means of this solution it is not necessary to access or step in the clean/outlet side of the flow channel for mounting of the second filter.

Preferably, the filters have a frame with which they are affixed to the partition wall. The frame of the filters is fluid-tight and provides mechanical stability to the filter. It furthermore holds the filter medium in position. The fluid flow is fed into and out of the filter medium through openings in the frame. Preferably, a part of the frame of a filter completely surrounds an opening in the partition wall. Preferably, each filter is fluid-tightly attached to the partition wall. Preferably, the frames of a first and a second filters overlap at least partially in one direction largely vertically to the partition wall. This way both filters together require less space on the partition wall. The space between the openings in the partition wall is thus smaller. Preferably, this way the number of openings in the partition wall can be increased and, as a result, more filters can be installed. At a constant total volume flow of the fluid, the volume flow per filter is thus reduced. The lower volume flow per filter results in a longer service life of the filters and in a lower differential pressure. Preferably, the area in which the frames of a first and a second filter overlap in one direction largely vertically to the partition wall amounts to at least 2% of an overall projected area of filtration in the partition plane constituted by the partition wall. Further preferred, the area in which the frames of a first and a second filter overlap amounts to at least 5%, 10%, 15%, and mostly preferred 20% of the overall projected area of filtration in the partition plane. Preferably, the filters are arranged in at least one row. Further preferred, the filters are arranged in several parallel rows. Preferably, the filters of the at least one row are alternately affixed from the dirty side and from the clean side, or respectively, the filters of the at least one row alternately basically extend to the dirty side and the clean side. Preferably, the filter elements are arranged in several parallel first rows and second rows inclined thereto. Preferably, the filters of the first parallel rows as well as of the second rows inclined thereto are alternately affixed from the dirty side and from the clean side, or respectively, the filters of the first parallel rows as well as of the second rows inclined thereto alternately basically extend to the dirty side and the clean side. Preferably, the inclined second rows are arranged vertically to the first rows. Preferably, the filters have a largely round, oval, rectangular, square or polyangular cross section. Preferably, the filters contain folded or embossed filter media. Preferably, the filters have one of the filter classes G, M or F according to EN779:2009 or one of the filter classes EPA1, HEPA2 or ULPA3 according to EN1822:2012. Wherein "EPA" means "Efficient Particulate Air filter", "HEPA" means "High Efficiency Particulate Air filter" and "ULPA" means "Ultra Low Penetration Air filter" Preferably, the fluid is a gas, air or a liquid. Preferably, the outflow opening is connected to a fluid consumer which preferably is a compressor, gas turbine, pump or building, automotive, or process ventilation system. Preferably, the filter media contained in the filters have an asymmetric structure in the flow direction. Preferably, the filter media include at least one membrane layer. Further preferred, the filter media have a multi-layer structure.

The invention furthermore comprises a method in particular for cleaning the intake air of a gas turbine by means of a flow channel surrounded by walls with an inflow opening and an outflow opening, a partition wall with at least two openings which is positioned between the inflow opening and the outflow opening and limited by the walls of the flow channel, and at least two filters for purifying a flowing fluid, characterised in that at least one filter is installed or mounted at a first opening of the partition wall on the dirty/inlet side and at least one filter at a second opening in the partition wall on the clean/outlet side.

The invention further refers to a filter holder, for affixing at least two filters or filter elements, each of which filter elements constituting one single mounting unit, to a filter arrangement, in particular of a turbine. The filter arrangement allows for a fluid to flow through the at least two filters from a dirty side to a clean side. According to the invention the filter holder's design allows for the mounting of at least one filter or filter element on the dirty side and at least one filter or filter element on the clean side.

Preferably, the filter holder according to the invention is designed as one or more vertical or horizontal support strut. Further preferred, the related support struts are arranged in a plane and form a filter wall together with the filters. Preferably, the filter holder is designed with several support struts two of which support a filter at its opposite edges respectively. Preferably, the filter holder holds several filters at the dirty side and at the clean side, respectively, whereby these filters are arranged in a row. Preferably, the filter has a frame to be affixed to the filter holder comprising a filter media packet inserted therein. Preferably, the filter, in particular the frame, planarly connects to the filter holder in sections. Preferably, the filter juts out over the filter holder at the dirty side and at the clean side. Preferably, the filter has a filter element which is v-shaped in cross section.

The invention is also directed to the use of a filter holder for affixing at least one first filter to the dirty side and at least one second filter to the clean side of a filter wall, in particular of a gas turbine.

Moreover, the invention concerns a method for affixing at least one first filter and at least one second filter to a filter wall, in particular of a gas turbine, whereby the at least one first filter is mounted on a clean side of the filter wall and the at least one second filter is mounted on a dirty side of the filter wall.

The invention is furthermore directed to a filter set with at least one first filter element adapted to be installed at a first opening on the dirty side of a partition wall of a filter system, in particular according to the invention, and with at least one second filter element adapted to be installed at a second opening on the clean side of the partition wall of the filter system. The second filter element is designed with a filter frame whose related filter medium is installed reversely compared to the first filter element, viewed in flow direction of fluid flowing through the partition wall.

The invention solves the problem of increasing the number of filter elements of a particular design in a parallel arrangement on a filter wall in a filter house or flow channel in order to thereby increase the filter class or the service life of the filter without having to enlarge the dimensions or cross section of the filter house/flow channel and filter wall, respectively.

Filter elements where the filter medium is built in a filter frame generally have an area of the filter frame with which it is affixed to a partition wall. This area is called a flange portion or header. In the filter house the partition wall separates a relative dirty side and a relative clean side. In general, the flange portion of the filter is attached to the partition wall in a way that is impermeable for the medium to be filtered so that the medium to be filtered can only enter or escape through the remaining openings in the filter frame. The flange portion of the filter element surrounds the openings in the filter frame, is in general sealingly attached to the filter wall and usually surrounds one filter wall opening. Accordingly, the dirty side and the clean side are in particular separated by the filter frame seals on the partition wall.

The size of the flange portion of a filter is determined by various factors. On the one hand, a minimum flange portion surface connecting to the filter wall is required for reasons of stability. On the other hand, a seal attached to the filter frame or the filter wall occupies space and must also lie within the flange portion.

It is common that compact cartridge filters are put through an opening in the filter wall. In such case, the external dimensions of the filter must be larger than the dimensions of the opening in the filter wall in order to prevent that it falls through to the other side of the filter wall. The flange portion of the filter element thus establishes a positive joint to the filter wall.

Usually, the filter medium is connected to or cast into the filter frame in the area of the flange portion or directly adjacent to it. In this area, the filter frame is impermeable for the medium to be filtered. In particular in case of folded (pleated) filter materials, this area is a function of the pleat depth. In case of filter elements that are typically used for gas turbines or air compressors, the pleat depth usually ranges from 4 mm to 100 mm, in case of compact cartridge filters and filter candles, it usually ranges from 20 mm to 50 mm and in case of filter elements with two folded media packets arranged in a v-shape, it usually ranges from 50 mm to 100 mm. Together with the flange portion, the edge area of the filter element which is impermeable for the medium to be filtered can therefore be larger than 100 mm and the inlet or outlet openings for the medium to be filtered can be positioned at a distance of more than 100 mm from the edge of the filter, respectively.

If two adjacent filter elements are arranged at a filter wall so that one filter element is affixed to the dirty (raw gas) side and an adjacent filter element to the clean (clean gas) side, the respective frame areas of the first and second filter element which are attached in a way that it is impermeable for the medium to be filtered can in one direction be arranged to one another in a way so that they partly overlap, and this largely vertically to the filter wall. By this arrangement, these filters need less space on the filter wall and the distance of the respective filter wall openings is reduced accordingly. However, the inlet and outlet openings of the filter elements are ideally not covered. At a constant volume flow, this configuration has an approximately similar pressure drop across the filter wall as in an arrangement of the filter elements on one side.

The filter elements are in general arranged in rows on a filter wall. Ideally, adjacent filter elements of a row are alternately arranged on the dirty (raw gas) side and the clean (clean gas) side. Depending on the dimensions of the respective filter wall and the respective filter dimensions, a filter row can contain more filter elements in this two-sided arrangement than in a single-sided arrangement of the same filter elements. Altogether, a filter wall can thus contain more filter elements and, at a defined total volume flow, the latter is accordingly divided to more filter elements than in case of a conventional single-sided installation of the filter elements.

A lower volume flow per filter element is advantageous for many reasons. On the one hand, the service life of the filter elements is extended as the quantity of particles to be filtered per time unit is reduced proportionally. On the other hand, the pressure drop across the entire filter stage filter wall (filter wall and filter elements) is reduced as it depends on the volume flow per filter element. A lower pressure drop has in turn several advantages. It is e.g. possible to install filter elements with a higher separation efficiency or higher filtration class which would normally create too much differential pressure across the filter stage (filter wall and filter elements) filter wall due to the higher flow resistance. For instance gas turbines which are used on offshore oil and gas production platforms are mainly equipped with pocket filters of a filtration class according to EN779:2009 which are operated at very high volume flows in the area of approximately 7000 m3/h to more than 8000 m3/h. A higher-value filtration with EPA, HEPA or ULPA filters according to EN1822:2012 is not convenient at such high volume flows per filter element. The maximum differential pressure limit would either be reached after a very short loading time of the filters or would already be too high for new filters or the filter house (cross section flow channel) and the filter wall would have to have considerably larger dimensions in order to reduce the volume flow per filter element. However, due to the confined space and the maximum admissible load capacity of the platforms, this is not possible.

Another advantage of a lower pressure drop across the filter stage (filter wall and filter elements) is that the energy efficiency of the gas turbine is higher in comparison to a filter stage with a higher differential pressure.

A lower initial differential pressure of newly installed filters furthermore means that the filters can be operated for a longer time before the differential pressure reaches the maximum admissible differential pressure due to the loading with particles. The differential pressure range is thus higher in comparison to a filter stage (filter wall and filter elements) with a higher initial differential pressure. In addition the filters can be changed before they reach their unstable phase in which the filter differential pressure responds strongly to changing environmental conditions. Thus unexpected shut downs are reduced and the overall system reliability is increased.

The two-dimensional arrangement of the filter elements on a filter wall is frequently implemented in the form of parallel rows. Mostly, the filters are arranged in second rows which are typically vertical to the first rows. These vertical rows are also parallel to each other. It is, however, also possible to arrange the second rows in an inclined angle to the first rows. The filter elements thus form a matrix on the filter wall. As already described above, it is advantageous to arrange the adjacent filter elements in a row alternately on both sides of the filter wall.

There are two variants of the two-dimensional arrangement of the filter elements on a filter wall. The two variants have in common that the filter elements in the first rows (parallel to each other) are alternately arranged on the dirty (raw gas) side and the clean (clean gas) side of the filter wall. In the first variant, the filters in the second rows that are inclined to the first rows are only affixed to one side of the filter wall. This has the advantage that this arrangement is compatible with most of the conventional filter elements and, at the same time, a quite high degree of overlapping between the individual filter elements is already achieved. In particular rectangular cartridge filters or v-shaped filter elements have the main part of their medium-tight frame edge area at only two opposite sides of the frame flange portion. This is due to the fact that the folded (pleated) filter packets are in this area sealingly connected to the filter frame across the entire pleat depth. In the direction at an angle of 90 degrees thereto, the area of the folded (pleated) filter medium packets to be sealed is relatively small.

In a second variant of the two-dimensional arrangement of the filter elements on a filter wall, each filter adjacent to a first filter is attached to the side of the filter wall opposite to the first filter. This has the advantage that a maximum overlapping of the flange portions of the first filter is possible. In some cases, the filtration efficiency of filter media depends on the direction. In other words, the filtration efficiency, such as filtration class or service life, depends on the direction in which the fluid flows through the filter medium. The reason for this may be a gradual structure or a multi-layer structure of the filter medium where the individual layers have different features. In particular filter media with a microporous membrane often have such a multi-layer structure (EP1674144).

If the filter elements are arranged on the dirty (raw gas) side as well as on the clean (clean gas) side of a filter wall according to the invention, the flow direction, in particular with regard to otherwise identical filter frames, depends upon on which side of the filter wall such are installed. When using direction-dependent filter media and in particular multi-layer filter media, the filter element therefore has to be installed in a way that the flow direction determined by the arrangement of the filter element on the filter wall is identical to the flow direction of the filter medium.

Example: A filter type which is typically used for filtering the intake air of gas turbines is a so-called "ASC4 filter". This can have a simple v-shaped design or also a two-part form. The filter is affixed to the filter wall and sealed. The conventional arrangement is to install the filter elements on the raw gas side of a filter wall. The number of filter elements is determined by the width of the filter frames and by the dimension of the filter wall. The width of the outlet opening of this filter type is approximately 40% of the overall width of the filter. The overlapping flange portion in relation to an adjacent filter thus amounts to approximately 30% of the overall width of the filter element. In this precise case, a two-sided arrangement according to the invention allows for the installation of at least eight filter elements on a filter wall on which originally only six filter elements could be mounted side by side in one row, without limiting the inflow or outflow openings of the filter elements.

The invention further has for its object, a means of reducing the overall net volumetric geometry and associated system weight, whilst meeting or exceeding the existing technological specification. Therefore within the concentration of the technology is a significant onward benefit to industrial markets. By geometric volume the traditional filter system box which houses the filter elements represents the largest single assembly supplied as an ancillary for the gas turbine. Indeed for all air treatment systems and across all sectors (turbine machinery, pollution control devices, HVAC, diesel engines, compressor) a significant problem is posed due to the physical size/geometry and its respective mobilisation to the end site and final design integration into the plant. On marine vessel ships such as FLNG, LNG carriers, fast ferry and passenger cruise liners gas turbines and diesel engines are used to produce power for propulsion where the engine drives the propeller shaft. Thus engine room space is a function of overall turbine package size and respectively the intake filter house. The invention therefore allows for a lower filter house dimension and consequently the smaller use of the limited engine room cavity can result in additional passenger capacity with the same dimensions, or increase the cargo capacity on a LNG or freight carrier. For smaller ships such as fast ferry catamarans (typical 325-foot) the smaller and lighter by weight filter box system will allow designers greater flexibility to integrate the system into this very compact setup without comprise to the air quality. Due to the global nature of the respective markets; it is typical that filter housings will be required to transport internationally from the point of manufacture to the end destination. It is common that this will see repeated cross continent shipment. Since the system is in almost all cases transported as finished goods the bulk of the equipment incurs significant transportation costs and associated disruption. The invention therefore allows for significant market cost efficiencies for the many thousands of systems which are transported annually.

In some cases, it might be desirable to utilize the benefits of the invention, but at the same time to maintain the original filter house set up and to not modify the partition. This could be the case, when the benefits of the invention need to be tested initially by the user, while keeping the option open to revert back to the original set-up with the original filter elements. For those cases it is proposed to install adapter plates, to cover the existing holes of the partition. Preferably, the adapter plates have similar dimensions to the filter frame, which mounts to the partition. They could even have similar flange areas and even have a gasket attached to them, just like the original filter element. In that case, the original fixtures can be used to attach the adapter plate to the partition and to ensure an airtight seal between them. While it is a removable solution, the adapter plates could also be installed by permanently fixing them to the partition by means of e.g. welding, soldering, or gluing. The adapter plates themselves have again openings that allow attaching adjacent filter elements alternating from the clean side and from the dirty side. Preferably adjacent filter elements are installed on the adapter plate in a way, that the filter frames overlap in a direction perpendicular to the adapter plate. Preferably the closed area of the filter frames overlap as much as possible. Compared to the original set-up it maximizes the open area through which air can pass through the partition once the filters are installed and in addition it enables the total filter area to be increased.

In environments with high humidity or with high water droplet content in the air, like e.g. off-shore or in tropical regions, a high degree of water is collected by the filter media. Especially hydrophobic or even water tight filter media accumulate water on its upstream side. If the filter element is installed on a vertical filter wall (partition), water drainage becomes an issue against the air flow direction. In order to promote water drainage, a slight inclination of the filter element relative to the horizontal plane of the filter house is desired (WO2012038317). In cases where the filter elements are installed directly onto the filter wall, it might be desirable to incline the filter wall or parts of it in a way that it is angled less than 90 degrees, preferably less than 85 degrees, relative to the horizontal plane. In cases where adapter plates are used to mount filters to the filter wall (partition), the adapter plates can be shaped in a way that the mounting surface for the filter elements and the mounting surface for the filter wall form an angle larger than 0 degrees preferably larger than 5 degrees. The adapter plates can consist of several parts, but preferably they are formed as one part to avoid additional flanged sections. As a further alternative the filter elements themselves can be shaped in a way that water drains from them by gravity.

The filter wall (partition) and in particular the adapter plates can have different shapes. In the most common situation, they are of a planar shape. But in some cases it might be desirable that the mounting surface for the filter elements is curved. Especially in a situation where the spacing of filter elements is not even, a slight angle change of the individual filer elements could reduce the overall pressure drop of the system. Furthermore the loading characteristic of the uneven spaced filter elements will improve. The angled arrangement of the individual filter elements will lead to a harmonized flow distribution between the filter elements and therefore will lead to an even loading across all filter elements. This will result in an overall longer service live of the filter set installs in such a configuration.

Accordingly, the invention further refers to a filtration system, particularly for cleaning of intake air of a gas turbine, comprising: a flow channel with an inlet opening and an outlet opening, a partition with at least one opening between a dirty side and a clean side, which is positioned in-between the inlet opening and an outlet opening, and limited by the walls of the flow channel, at least one adapter plate with at least two openings, which covers the opening of the partition, and at least two filter elements for the cleaning of the fluid passing through the flow channel, characterized in that at least one first filter element is mounted to a first opening of the adapter plate on the dirty side and at least one second filter element is mounted to a second opening of the adapter plate on the clean side.

Preferably, the frames of a first and a second filter element are partially overlapping in a direction largely perpendicular to the adapter plate. Further preferably, the overlap of the frames of the first and the second filter element in a direction largely perpendicular to the adapter plate is at least 5% of the total projected filter area in the plane of the adapter plate or the partition.

In addition, the invention refers to a process for cleaning the intake air of a gas turbine, comprising: a flow channel with an inlet opening and an outlet opening, a partition with at least one opening between a dirty side and a clean side, which is positioned in-between the inlet opening and an outlet opening, and limited by the walls of the flow channel, at least one adapter plate with at least two openings, which covers the opening of the partition, and at least two filter elements for the cleaning of the fluid passing through the flow channel, whereby at least one first filter element is mounted to a first opening of the adapter plate on the dirty side and at least one second filter element is mounted to a second opening of the adapter plate on the clean side.

According to the invention, there further is provided a filter set with at least one first filter element, constituting a single mounting unit and being adapted to be mounted at a first opening on the dirty side of an adapter plate of a filter system, and at least one second filter element constituting a single mounting unit and being adapted to be mounted at a second opening on the clean side of an adapter plate of a filter system. Further, the invention teaches a filter set with an adapter plate, at least one first filter element installed at a first opening on the dirty side of the adapter plate, and at least one second filter element installed at a second opening on the clean side of the adapter plate, whereby the filter media of the first and second filter element is in parallel configuration in respect to the flowing media.

For safety reasons it is preferred to eliminate access doors on the clean side of the filter house and to install all filters from the dirty air side only. With that, the risk is reduced that foreign objects remain on the clean side and get sucked into the turbine, which could cause substantial damage.

In an even more preferred implementation of the current invention the filter wall includes preferably horizontal holding beams which constitute a filter holder. A first set of filter elements is mounted to these holding beams so that the filter elements protrude into the clean side of the filter house. The filter elements are mounted in rows, whereby each second row between two mounting beams is left vacant or open. These first filters elements are preferably positioned relative to the holding beams by positioning pins, which protrude perpendicularly from the holding beams to the dirty side. A second set of filter elements is mounted to the holding beams at the vacant rows in-between the first filter elements so that the filter frames of both filter sets overlap partially. The second set of filters protrudes into the dirty air side of the filter house. With this arrangement, filter elements of the first set and the second set are alternating and are mounted directly adjacent.

The filter elements are sealed to the mounting beams of the filter wall, as well as directly to each other. Preferably a compressible gasket in the form of a strip including a sealing lip is used to form that seal. The gasket is preferably part of the filter frame of each filter element. The gasket strip advantageously is located at the flange portion of the filter frame, preferably surrounding the filter opening encompassed thereby. In a preferred implementation the gasket of the first filter protrudes or projects outward from the filter frame so that it forms an overlap with the gasket of the second filter and with the filter wall.

Preferably, the frame parts are made of polymeric material by means of an injection moulding process. More preferably, the gasket is formed to or attached to the filter frame by means of this injection moulding process as well (multi-component injection moulding process) or by means of a second injection moulding process. Preferably, a bi-component injection moulding process is used so that the frame and the gasket are moulded together in a single step. This will allow for much tighter tolerances compared to a process at which the gasket is positioned to the filter frame at a second step.

Hereinafter, exemplary embodiments of the solution according to the invention are described in further details by reference to the enclosed drawings and the schematic figures shown therein.

BRIEF DESCRIPTION OF THE DRAWINGS

FIG. 30 Top view in section of a v-shaped filter element type D according to the invention.

FIG. 31 is a front view taken along the arrow XXXI of the filter element according to FIG. 30.

FIG. 32 is a rear view taken along arrow XXXII of the filter element according to FIG. 32.

FIG. 33 is a front view in section of a filter housing with the view onto a filter wall according to a forth embodiment of the invention.

DETAILED DESCRIPTION

Figure 1:
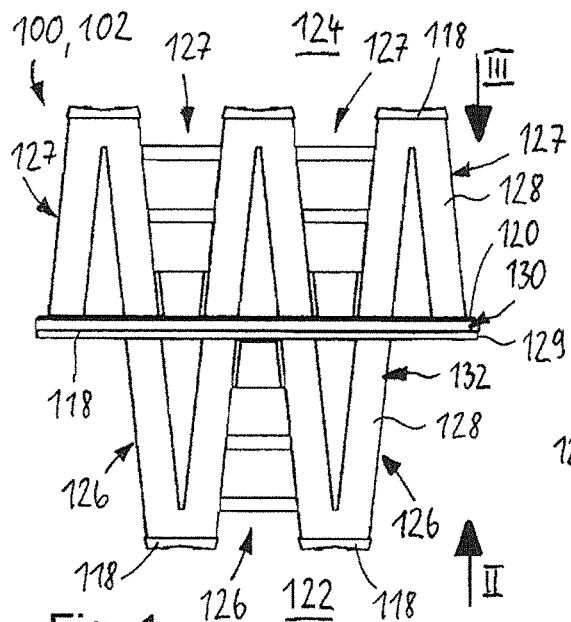
FIG. 1 is a top view of a type A cartridge filter of the prior art.

FIGS. 1 to 7 show various filters 100 which are typically used for filtering air or gases. The filters 100 are build as separate mounting units to be mounted to respective filter arrangements and can also be called just "cartridge filter" or "filter element". The filters 100 are inter alia used for filtering the intake air of gas turbines or air compressors as well as for filtering the air in buildings or technical gases. Each filter 100 includes a filter frame 118 which encompasses a filter medium 128. At the filter frame 118 a plat, planar, rectangular and frame-like flange portion 130 is provided at which the filter frame 118 can be attached at a filter wall 108 (see FIGS. 8 to 10). A seal 120 is located at the flange portion 130 such that it seals the filter frame 118 relative to the filter wall 108 and surrounds the flange portion 130.

Figure 2:
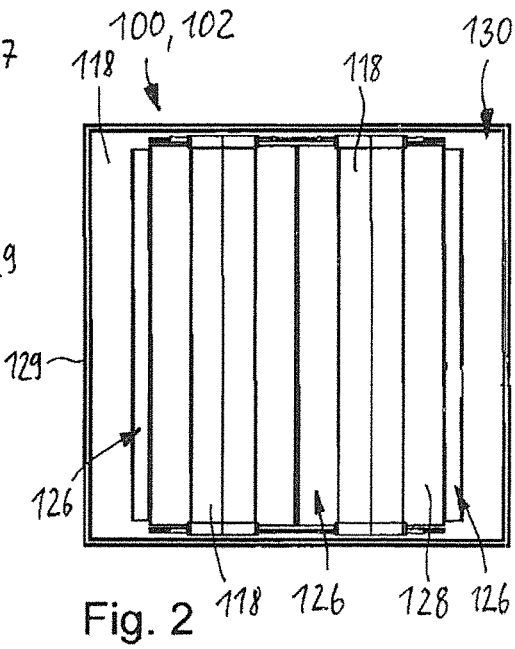
FIG. 2 is a front view taken along arrow II in FIG. 1.
Figure 3:
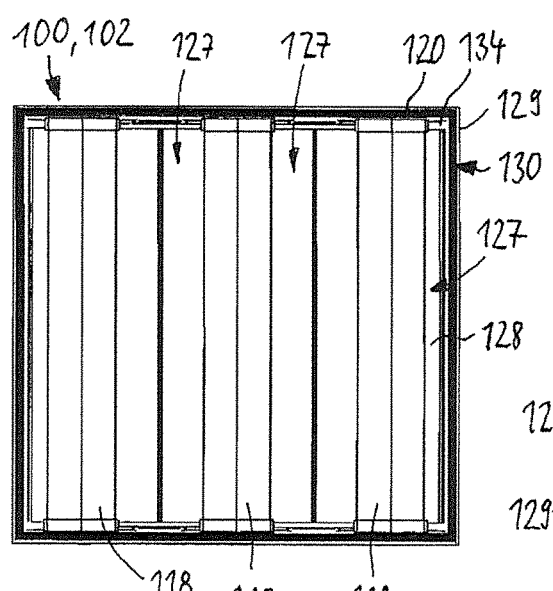
FIG. 3 is a rear view taken along arrow III in FIG. 1.
Figure 4:
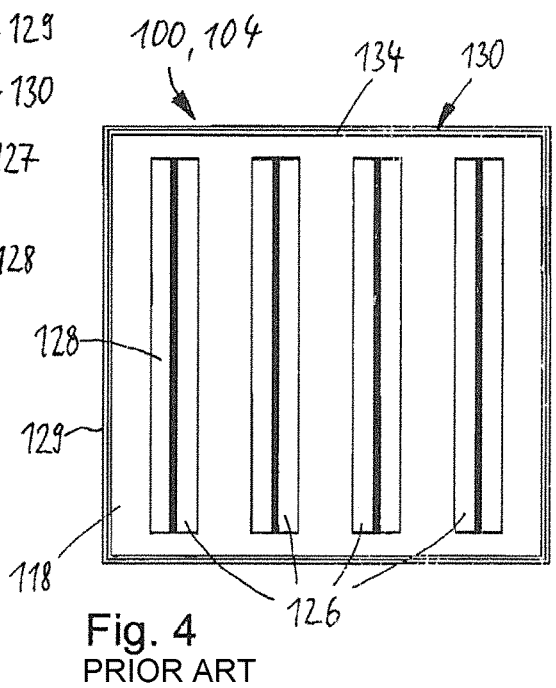
FIG. 4 is a front view of a type B cartridge filter of the prior art.

FIGS. 1 to 4 show two designs of so-called cartridge filters, whereby FIGS. 1 to 3 show a type A cartridge filter 102 and FIG. 4 shows a type B cartridge filter. The type A cartridge filter 102 is characterised in that the flange portion 130 with the seal 120 is largely positioned in the middle of the cartridge filter 102. This is clearly shown in FIG. 1. In other words, the flange portion 130 is a part of the filter frame 118 and serves the purpose of affixing the cartridge filter 102 completely sealed to a filter wall 108. Preferably, the filter frame 118 is impermeable for the medium to be filtered.

The medium to be filtered enters the filter medium 128 in the cartridge filter 102 at a dirty side 122 through inlet openings 126 in the filter frame 118 and is thereby purified. FIGS. 2 and 10 shows this in great detail. Afterwards, the filtered medium flows out of the cartridge filter 102 at the backward side of the filter 102 through outlet openings 127 to a clean side 124. This is shown in FIG. 3. The filter medium 128 is folded or pleated and has the form of in cross section rectangular media packets 132 which are arranged in a v-shape and are sealingly connected to the filter frame 118 at their edges. The open side of two media packets 132 which are both arranged on the clean side 124 in a v-shape leads to the inlet openings 126 in the filter frame 118. The inlet openings 126 and the outlet openings 127 have a certain distance to an filter edge 129 which is clearly shown in FIGS. 2 to 3. In this way, they are surrounded by a closed edge area 134 constituting inter alia the flange portion 130 of the filter frame 118. Type B cartridge filters 104 only differ from type A cartridge filters 102 in that the flange portion 130 is in longitudinal direction largely positioned at one end, here at the front end, of the filter element 104. FIG. 4 shows the front view of such a filter element 104 where eight media packets 132 are arranged in pairs in a v-shape so that the front view (FIG. 4) shows four inlet openings 126 in the filter frame 118. FIG. 4 also shows that the inlet openings 126 have a certain distance to the filter edge 129 of the filter element 104 and that, as a result, there is a closed edge area 134 which surrounds all openings 126. The mounting situation of these type B filter elements 104 is shown in FIG. 9.

Figure 5:
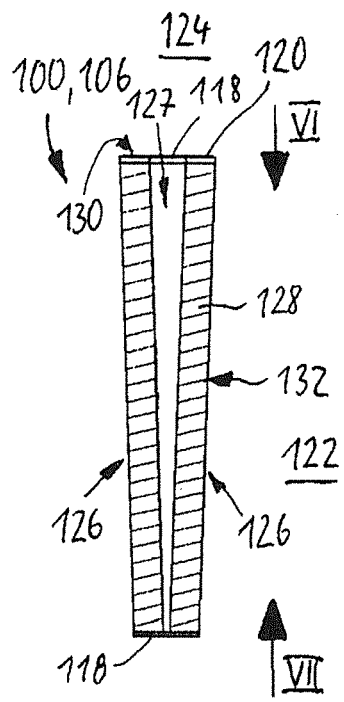
FIG. 5 is a top view in section of a filter with a v-shaped design of the prior art.
Figure 6:
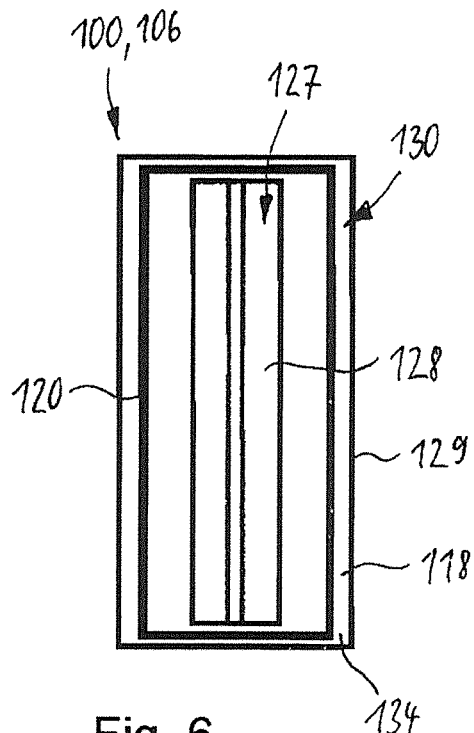
FIG. 6 is a rear view taken along arrow VI in FIG. 5.
Figure 7:
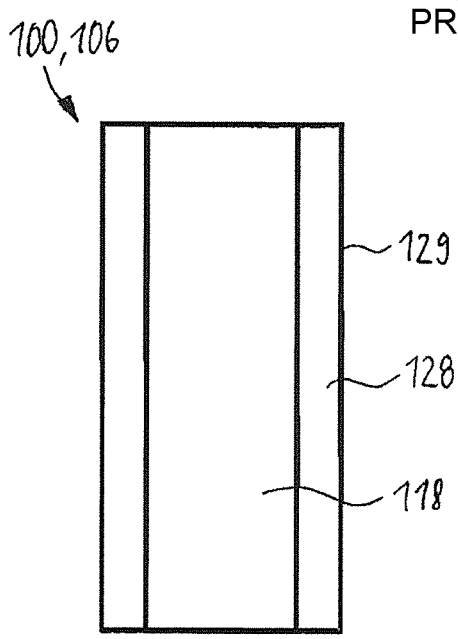
FIG. 7 is a front view taken along arrow VII in FIG. 5.

FIGS. 5 to 7 show various views of a filter element 106. FIG. 5 shows the top view in section, FIG. 6 the rear view and FIG. 7 the front view. The filter element 106 includes a flange portion 130 which is a part of a filter frame 118 and serves the purpose of affixing the filter element 106 to a filter wall 108 (see FIGS. 11 and 12). Preferably, the filter frame 118 is impermeable for the medium to be filtered and has several purposes. It provides mechanical stability to the filter element 106 and holds the media packets 132 in position. The medium to be filtered enters the filter medium in the filter element 106 through its inlet openings 126 in the filter frame 118 and is thereby purified. Afterwards, the filtered medium flows out of the filter element 106 through outlet openings 127. This is shown in FIG. 6. The filter medium 128 is folded/pleated and again has the form of two media packets 132 which are arranged in a v-shape and are sealingly connected to the filter frame 118 at their edges. The open side of the two media packets 132 leads to one single rectangular inlet opening 126 in the flange portion 130 of the filter frame 118. The inlet openings 126 again have a certain distance to the filter edge which is clearly shown in FIG. 6. In this way, they are surrounded by a closed edge area 134 of the filter frame 118 and the seal 120 incorporated therein.

Figure 8:
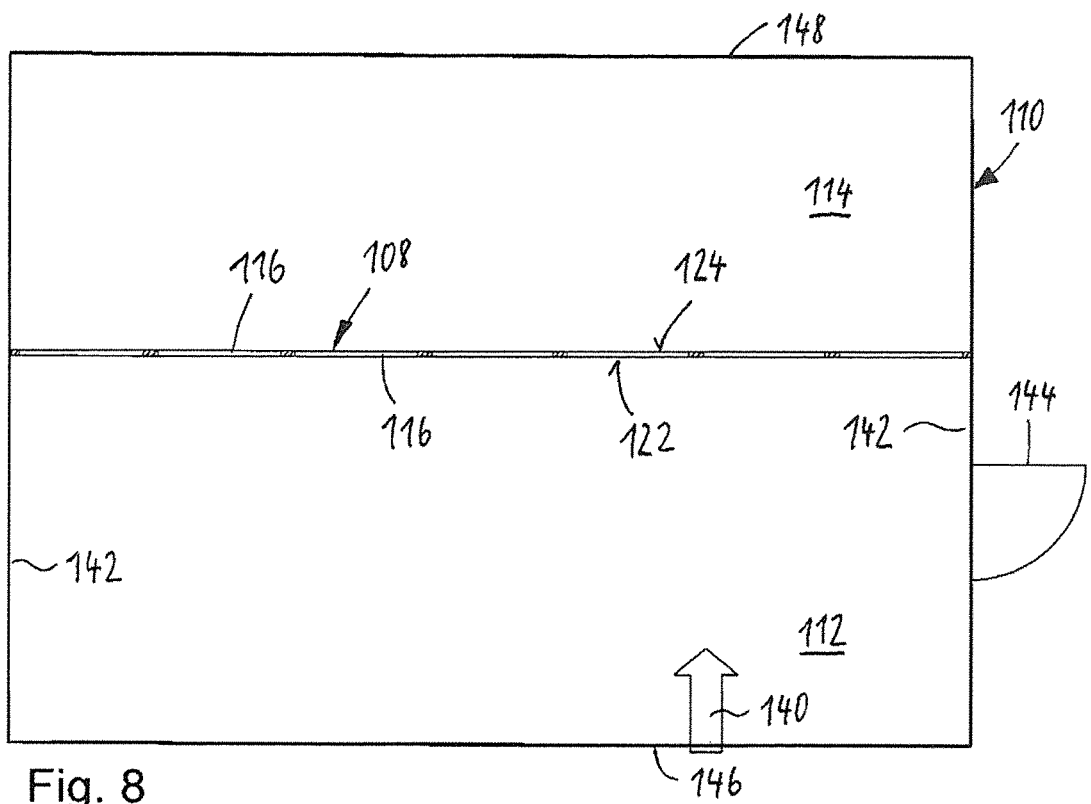
FIG. 8 is a top view in section of a filter housing including a filter wall of a first version of the prior art.
Figure 9:
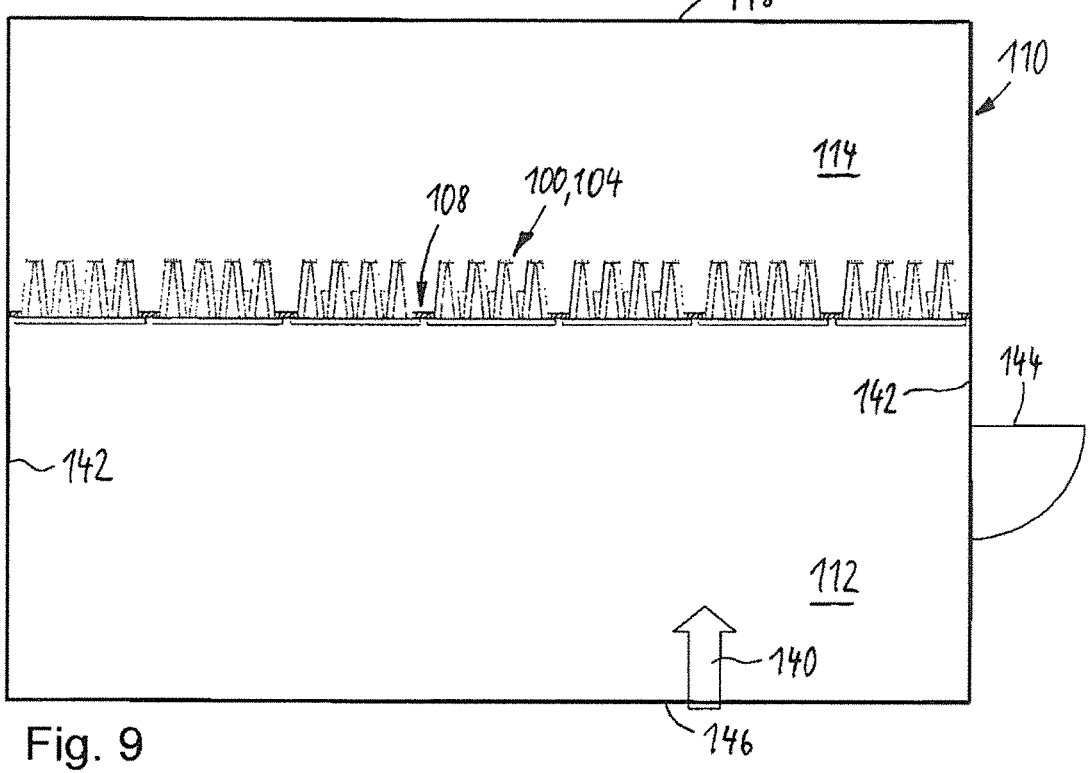
FIG. 9 is a top view of the filter housing of FIG. 8 with installed cartridge filters according to FIG. 4.
Figure 10:
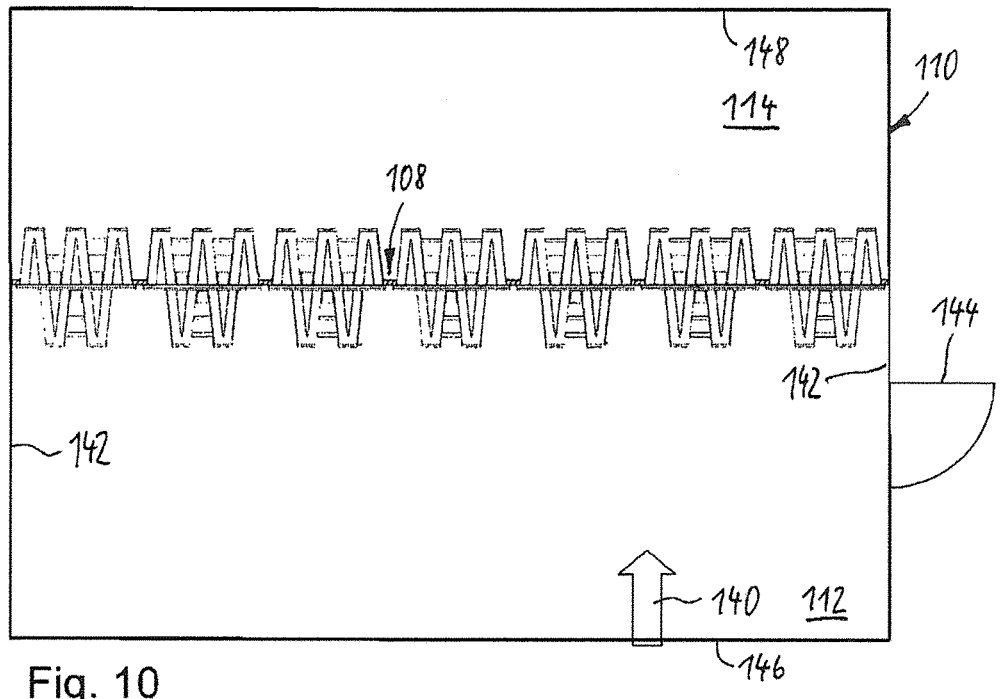
FIG. 10 is a top view of the filter housing of FIG. 8 with installed cartridge filters according to FIGS. 1 to 3.
Figure 11:
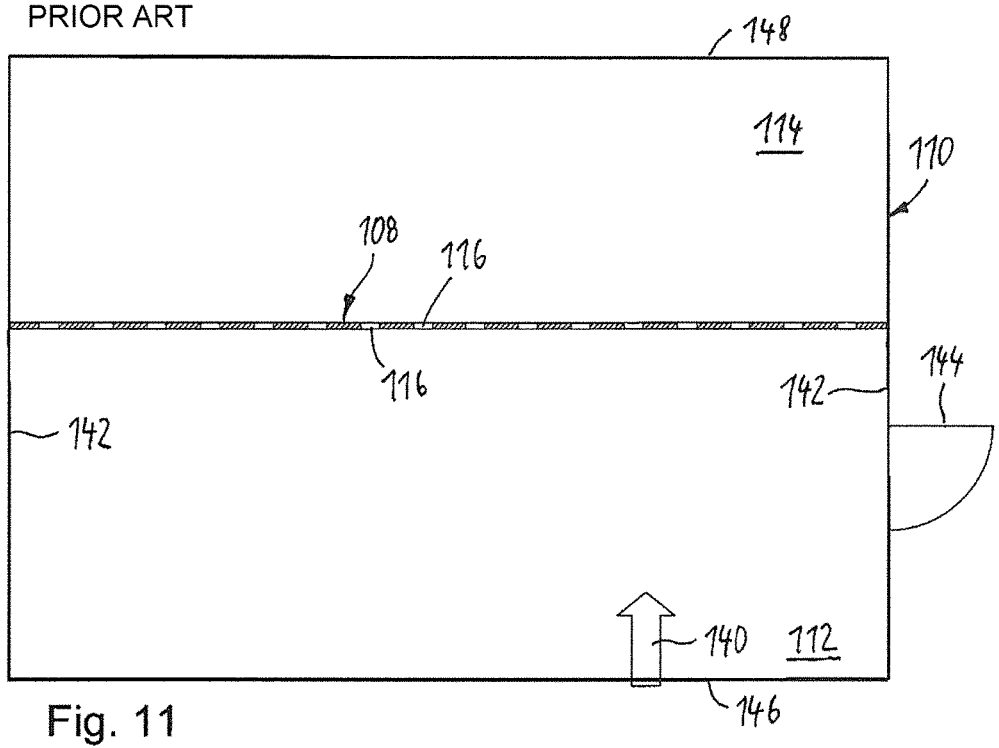
FIG. 11 is a top view in section of a filter housing including a filter wall of a second version of the prior art.
Figure 12:
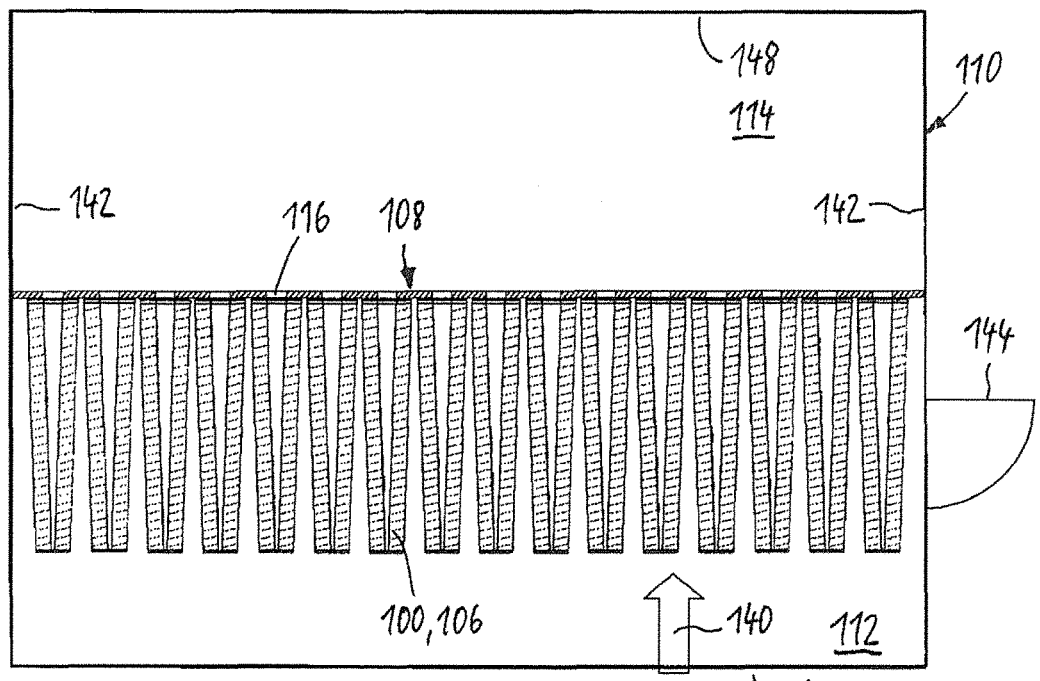
FIG. 12 is a top view of the filter housing of FIG. 11 with installed filters according to FIG. 5.

FIGS. 8 to 17 each show the top view in section of a filter house 110 bounded by walls 142. The filter house 110 provides a flow channel which has an inflow opening 146 and an outflow opening 148 for a medium to be filtered flowing through the flow channel along a flow direction 140. The outflow opening 148 is usually connected to a consumer for the purified fluid. A filter wall 108 is positioned transversely or crosswise to the flow direction 140 of the medium to be filtered and is limited by the walls 142 of the filter house 110. The filter wall 108 is shown from above in the sectional view. It has a raw gas/dirty side 122 facing the raw gas/dirty area 112 of the filter house 110 and a clean gas/clean side 124 facing the clean gas/clean area 114 of the filter house 110. The filter wall 108 has openings 116 through which the medium to be filtered flows from the dirty side 122 to the clean side 124. The walls 142 of the filter house 110 can contain access doors 144. FIGS. 9, 10 and 12 each show a filter house 110 where various filter elements 100 are mounted on one single side of the filter wall 108 according to the state of the art; in this case on the dirty side 122 of the filter wall 108. The maximum number of filter elements installed horizontally is determined by the width of the filter elements 100. In FIG. 9 there are seven type B filter elements 104, in FIG. 10 there are seven type A filter elements 102 and in FIG. 12 there are sixteen filter elements 106. FIGS. 8 and 11 each show a filter house 110 for the installation of the filter elements 102 and 104 or 106 respectively according to the state of the art, at which the filter elements 102 and 104 and 106 are not depicted.

Figure 13:
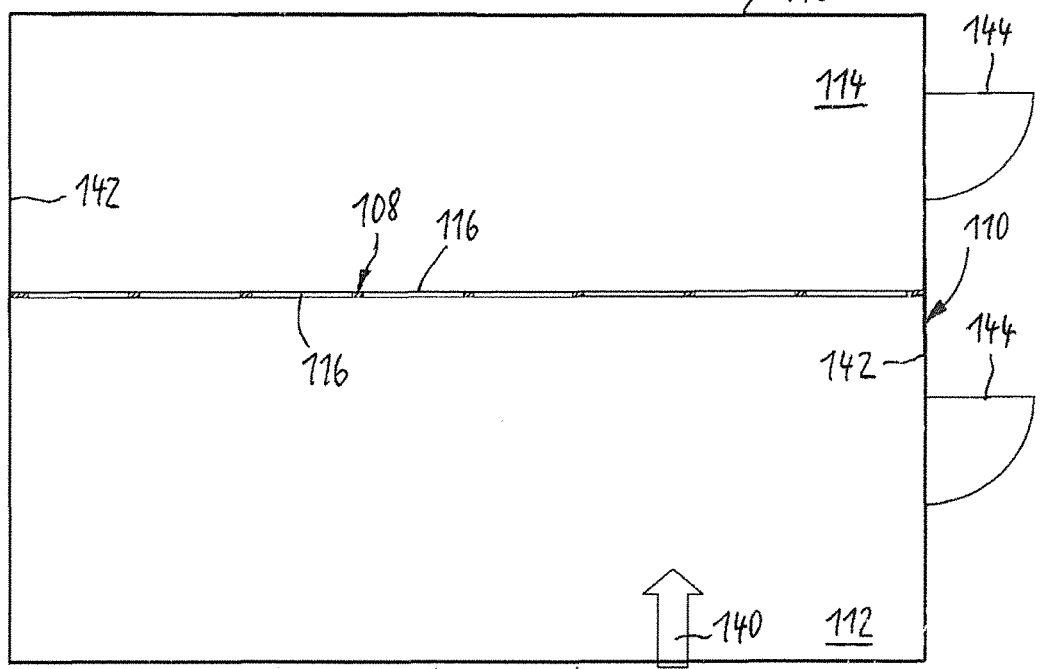
FIG. 13 is a top view in section of a filter housing including a filter wall according to a first embodiment of the invention.
Figure 14:
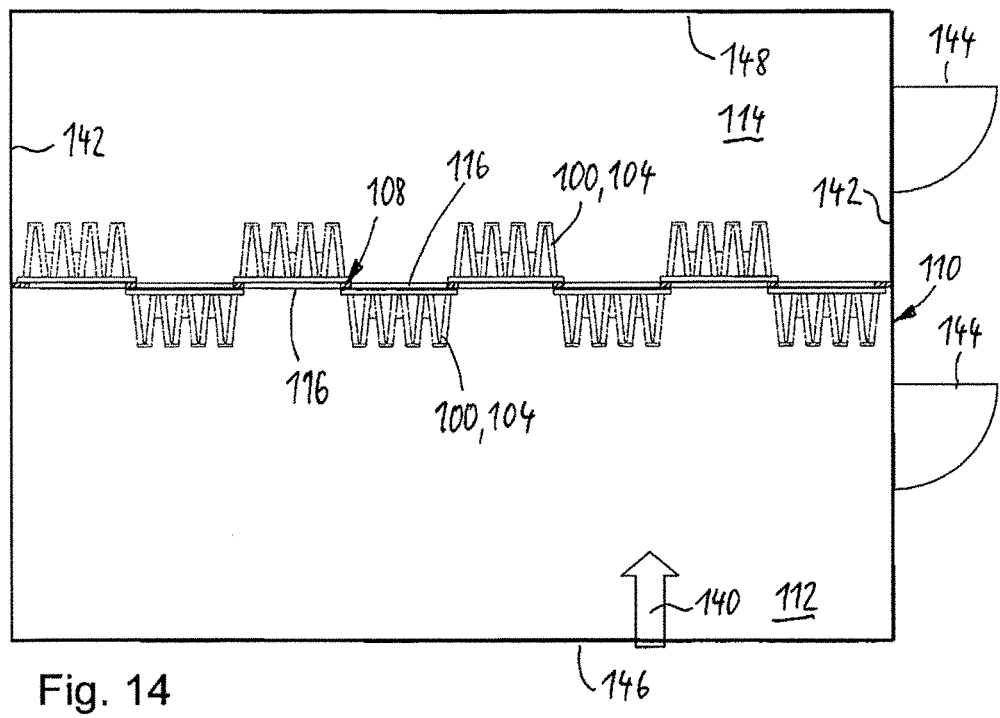
FIG. 14 is a top view of the filter housing of FIG. 13 with installed cartridge filters according to FIG. 4.
Figure 15:
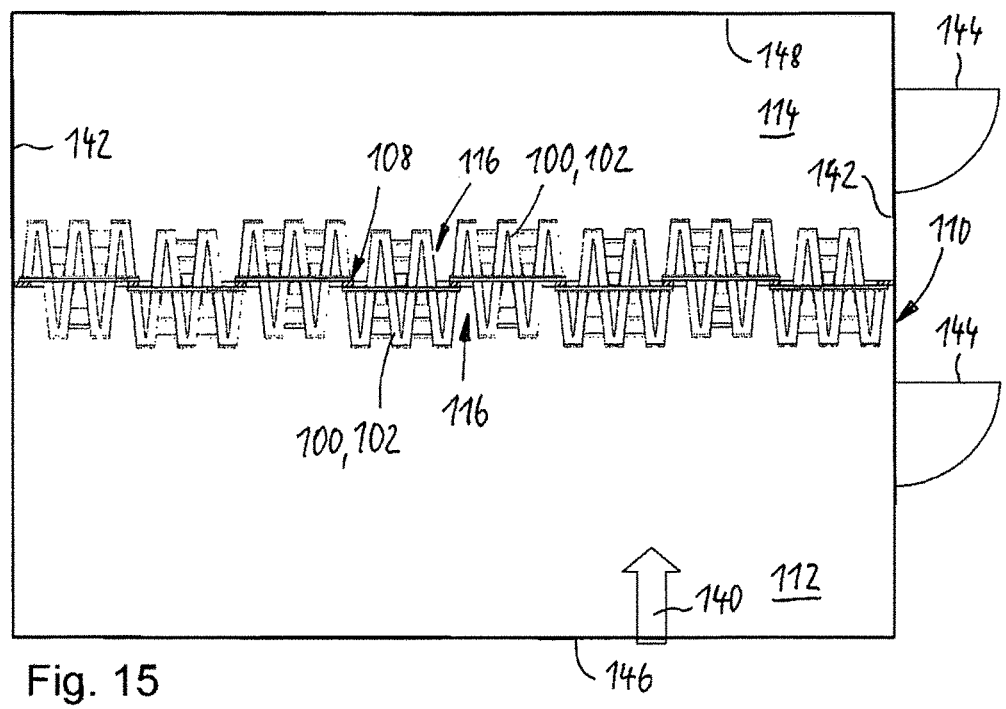
FIG. 15 is a top view of the filter housing FIG. 13 with installed cartridge filters according to FIGS. 1 to 3.
Figure 16:
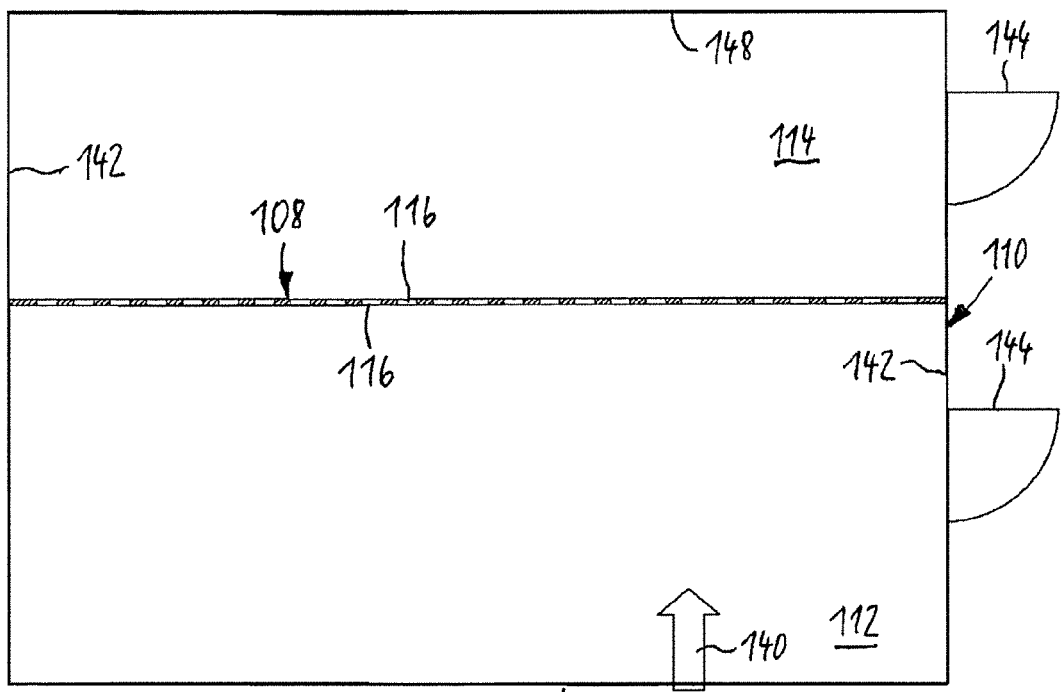
FIG. 16 is a top view in section of a filter housing including a filter wall according to a second embodiment of the invention.
Figure 17:
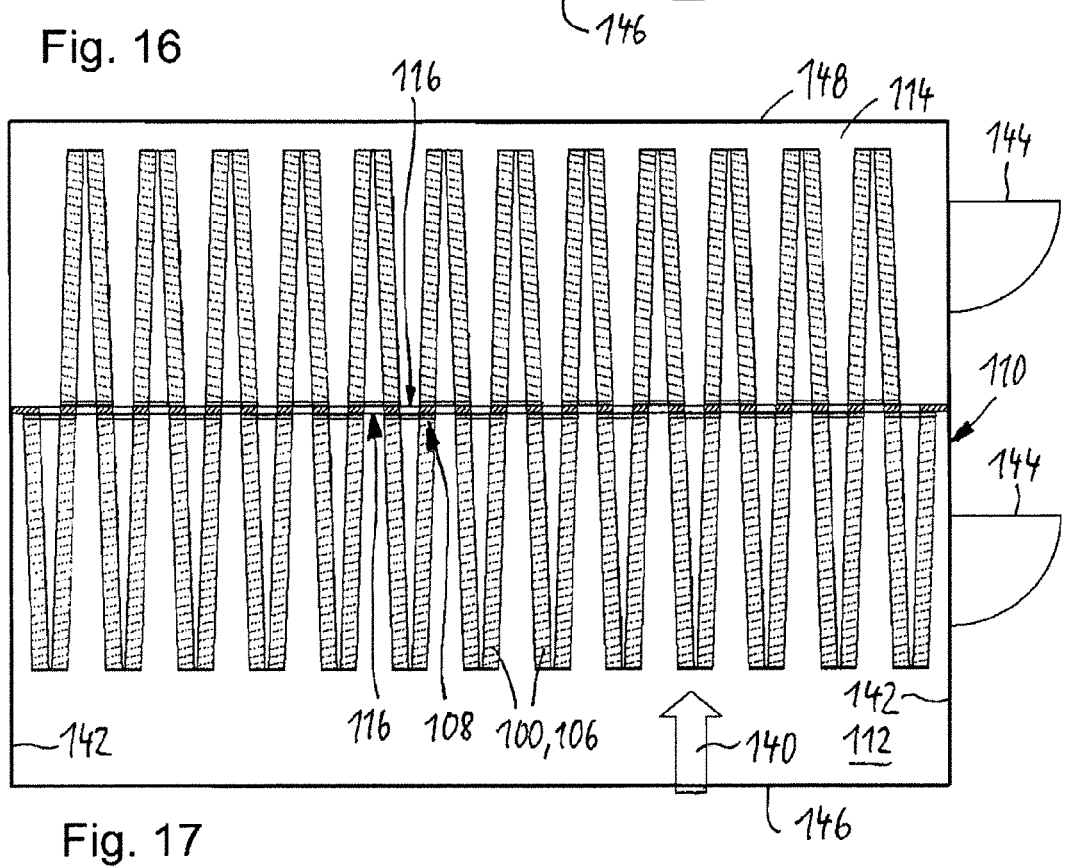
FIG. 17 is a top view of the filter housing of FIG. 16 with installed filters according to FIGS. 5 to 7.

FIGS. 14, 15 and 17 each show a filter house 110 where various filter elements 100 are alternately arranged on both sides of the filter wall 108 according to the invention. The arrangement is based on the awareness that the maximum number of filter elements installed horizontally is not only determined by the width of the filters 100 but also by the dimensions of the closed edge area 134 of the respective filters 100, as shown in FIGS. 1 to 7. As a result, according to the invention the number of filters 100 which can be mounted to a filter wall 108 with an unaltered width is increased. In FIG. 14 there are eight filter elements 104, in FIG. 15 there are eight filter elements 102 and in FIG. 17 there are 25 filter elements 106. FIGS. 13 and 16 each show a filter house 110 for the installation of the filter elements 102 and 104 or 106 respectively according to the invention. However, the filter elements 102 and 104 and 106 are not depicted.

Figure 18:
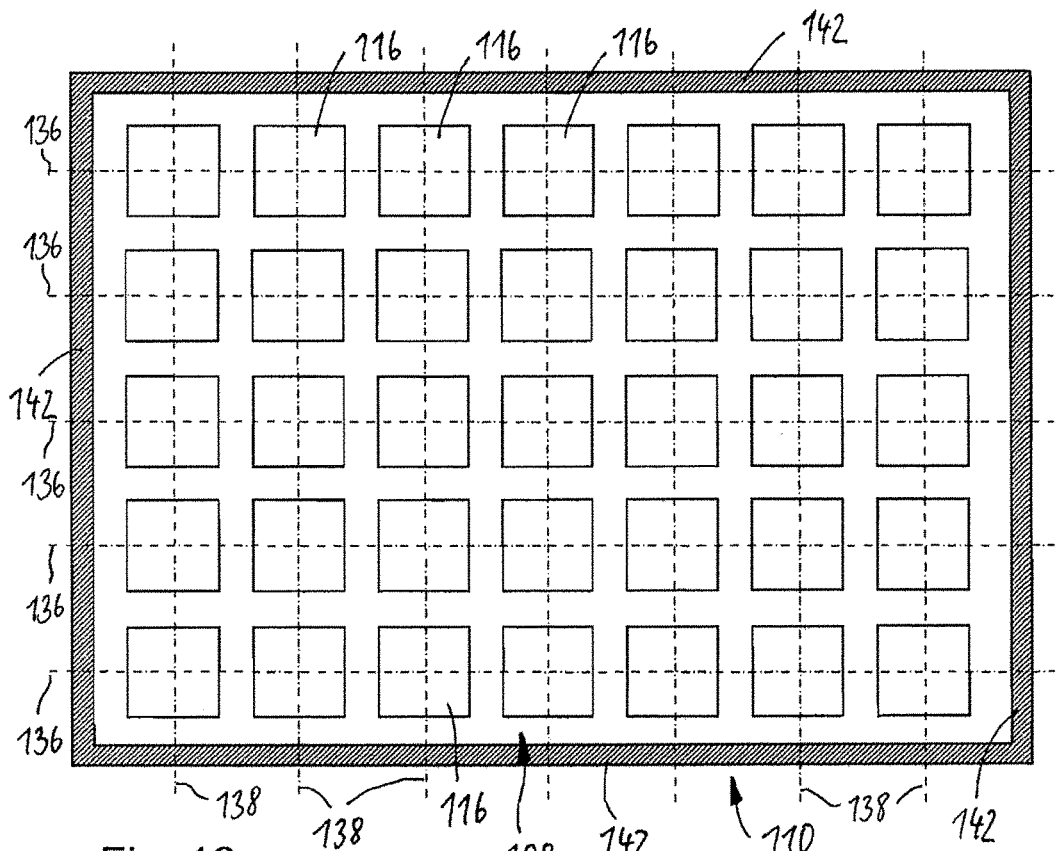
FIG. 18 is a front view in section of a filter housing with a view to a filter wall according to a version of the prior art and as used for the invention.

FIG. 18 shows the front view of a filter house 110 in section which was originally designed for the installation of cartridge filters 102 and 104 according to the state of the art. The filter wall 108 is limited by the walls 142 of the filter house 110 and contains thirty-five rectangular openings 116. The openings 116 in the filter wall are arranged in rows whereby five horizontal rows 136 or lines as well as seven vertical rows 138 or columns are parallel to each other.

Figure 19:
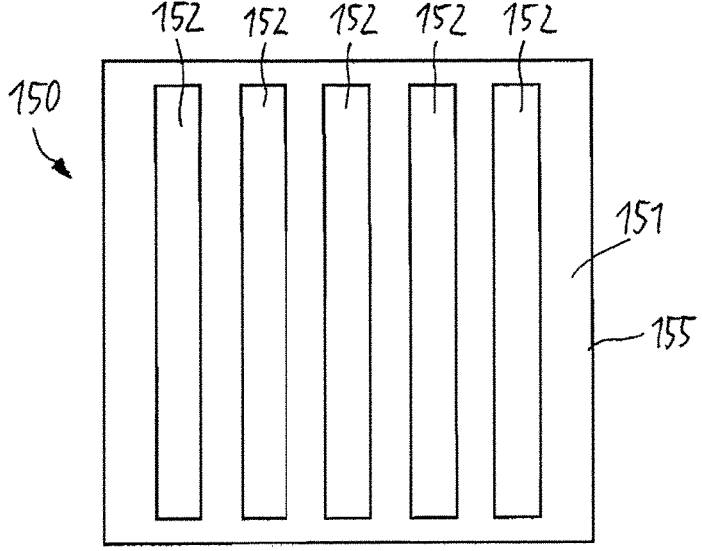
FIG. 19 is a front view of a first embodiment of an adapter plate according to the invention.
Figure 20:
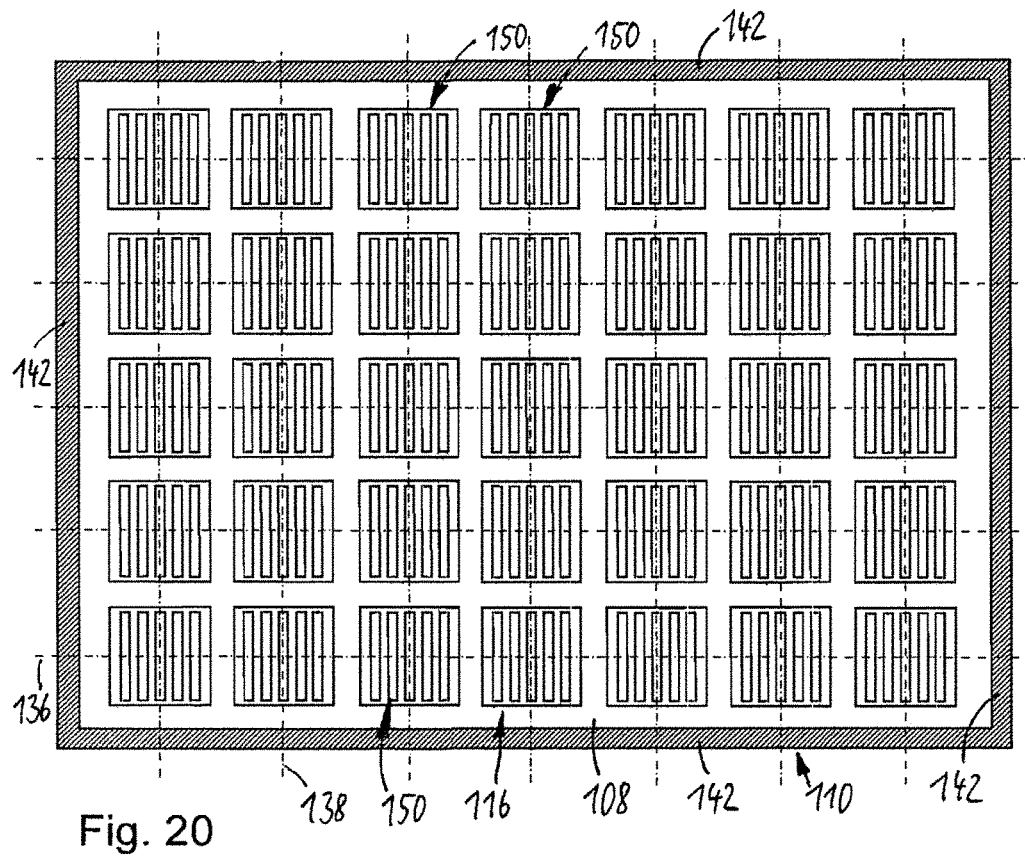
FIG. 20 is a front view of the filter housing of FIG. 18 with installed adapter plates according to FIG. 19.

FIG. 19 shows the front view of an adapter plate 150 which is to be slated for fixing filters 100 to the filter wall 108 of FIG. 18. The adapter plate 150 contains one or more openings 152, to which filters 100 can be mounted from the front or back side. FIG. 20 shows the view of FIG. 18 when the adapter plates 150 are fitted to the openings 116 of the filter wall 108 in a way that the filtration air must pass the openings 152 of the adapter plates 150. As one can see, one adapter plate 150 is superposed on one opening 116 respectively. Thus, the openings 152 of the adapter plates 150 are each covering the openings 116 of the filter wall 108.

Figure 21:
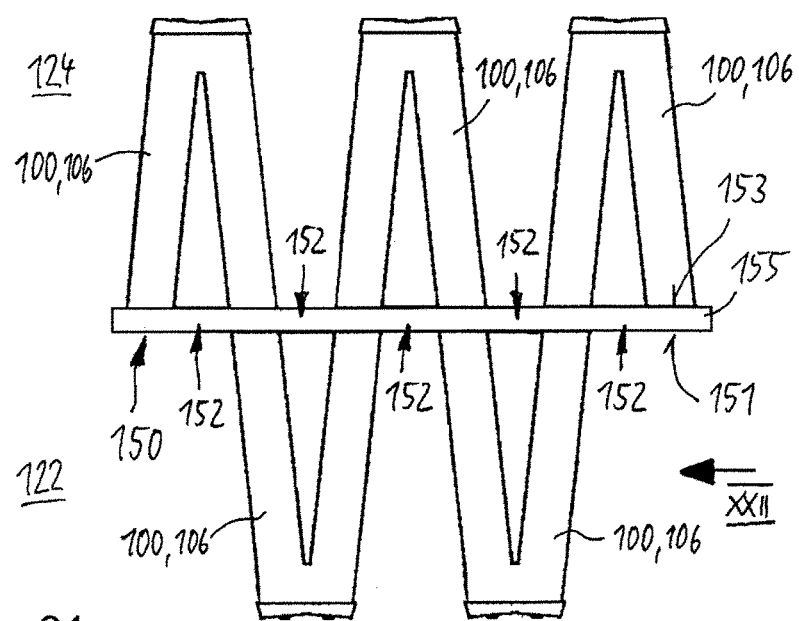
FIG. 21 is a top view of the adapter plate according to FIG. 19 with installed v-shaped filter elements according to FIGS. 5 to 7.
Figure 22:
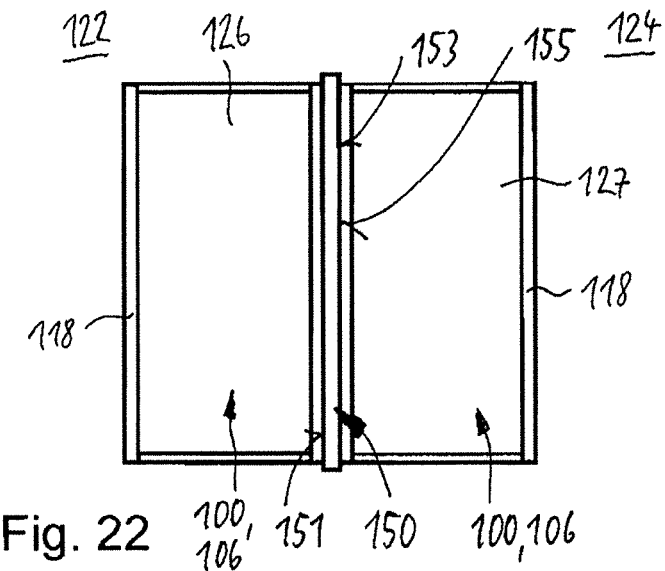
FIG. 22 is a side view taken along arrow XXII in FIG. 21.

FIG. 21 is the top view of five v-shaped filter elements 106, as they are mounted to the adapter plate 150. Two of the filer elements 106 are mounted on the dirty side 122 of the adapter plate and three of the filter elements 106 are attached to the clean side 124 of the adapter plate. Thereby the filter elements 106 are arranged alternately, each filter element 106 congruent to one of the five openings 152. In this way, a front mounting surface 151 and a rear mounting surface 153 of the adapter plate 150, each surrounding the openings 152, is optimally exploited for fixing thereon as many filters 100, here v-shaped filter elements 106, as possible. FIG. 22 illustrates that by a side view of the v-shaped filter elements 106 mounted to the adapter plate 150.

Figure 23:
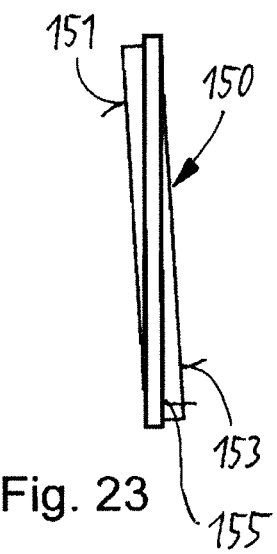
FIG. 23 is a side view of a second embodiment of an adapter plate according to the invention.
Figure 24:
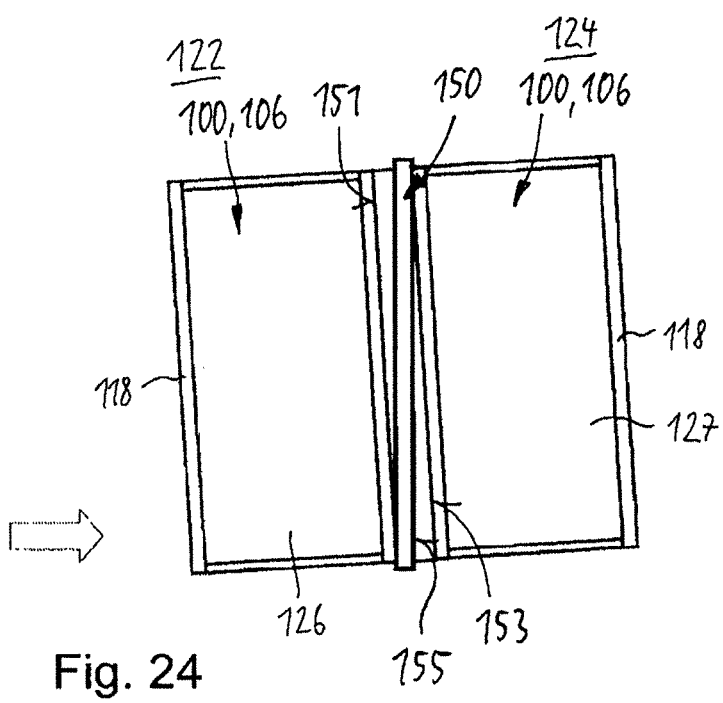
FIG. 24 is a side view of the adapter plate of FIG. 23 with installed v-shaped filter elements according to FIGS. 5 to 7.

In FIG. 23 an adapter plate 150 of a further embodiment is depicted, at which the front and rear mounting surfaces 151 and 153 for the filter elements 106 are angled or inclined to a closed edge area 155 of the adapter plate 150. The closed edge area 155 surrounds the adapter plate 150 at its outer rim and includes a seal 120 similar to the seal 120 of the filters 100. The closed edge area 155 thus provides a mounting surface of the adapter plate 150 to the filter wall 108. FIG. 24 shows an adapter plate 150 at which corresponding v-shaped filter elements 106 are mounted on the dirty side 122 and on the clean side 124. The angled positioning of the respective front and rear mounting surfaces 151 and 153 allows for an inclined installation of filter elements 106 relative to the plane of the filter wall 108. At the inclined filter elements 106 water drops which were kept back within the filter medium 128 of the filter media packets 132 is drained to the dirty side 122 and out of the filter elements 106.

Figure 25:
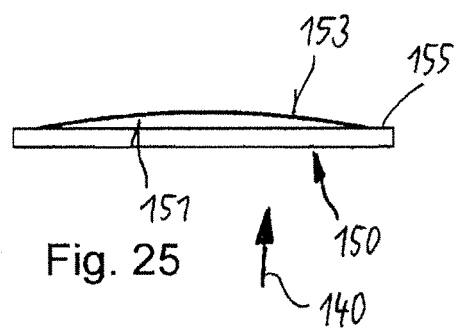
FIG. 25 is a top view of a third embodiment of an adapter plate according to the invention.
Figure 26:
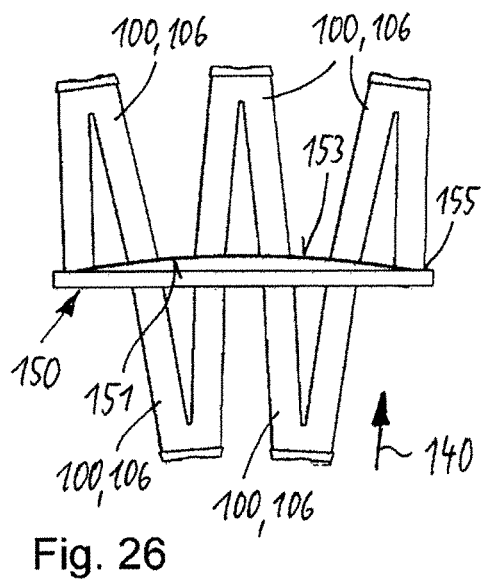
FIG. 26 is a top view of the adapter plate of FIG. 25 with installed v-shaped filter elements according to FIGS. 5 to 7.

FIGS. 25 and 26 are top views of a further embodiment of an adapter plate 150 and five v-shaped filter elements 106, which are mounted to said adapter plate 150. The front and rear mounting surfaces 151 and 153 of the adapter plate 150 at which the filter elements 106 are installed are curved in a horizontal direction to the clean side 124 of the corresponding filter house 110. In contrast, the closed edge area 155 of the adapter plate 150, which can be mounted to the filter wall, is flat. By mounting the filter elements 106 on such a front mounting surface 151, which is concavely curved, and on such a rear mounting surface 153, which is convexly curved, it is possible to spread the between the filter elements 106 on the clean side 124 providing more space and therefore less pressure resistance for the fluid flow on the clean side 124.

Figure 27:
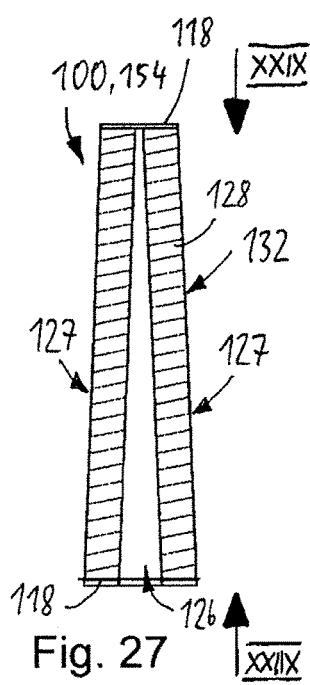
FIG. 27 is a top view in section of a v-shaped filter element type C according to the invention.
Figure 28:
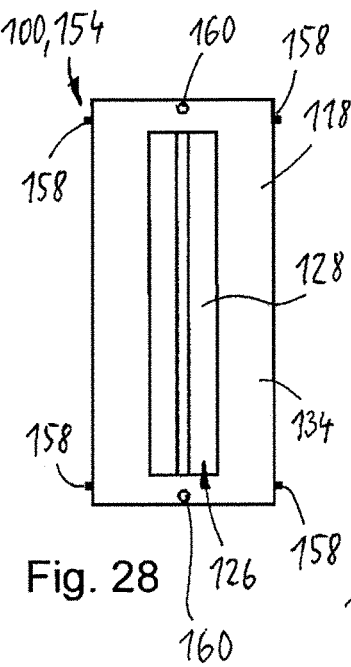
FIG. 28 is a front view taken along arrow XXIIX of the filter element according to FIG. 27.
Figure 29:
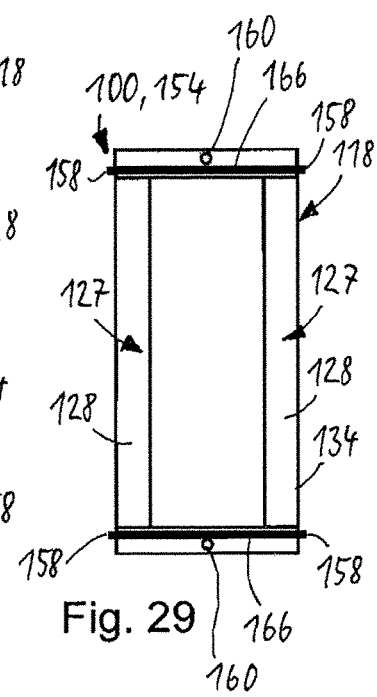
FIG. 29 is a back view taken along the arrow XXIX of the filter element according to FIG. 27.
Figure 37:
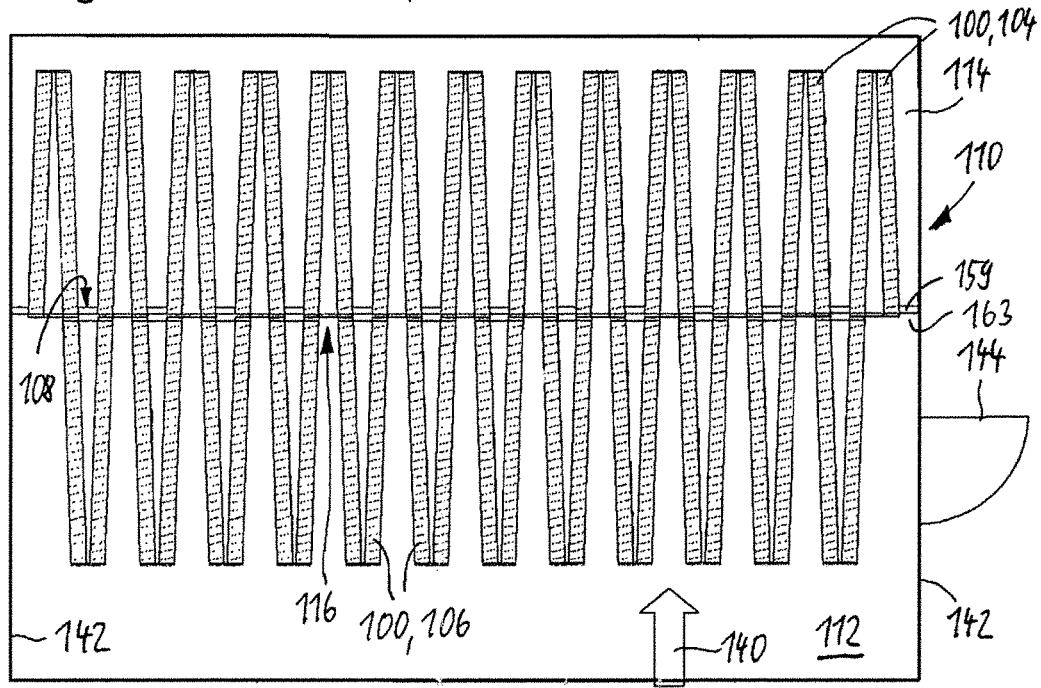
FIG. 37 is a top view in section of the filter housing according to FIG. 35.

In FIGS. 27 to 29 a further v-shaped filter element 154, here of a type C, is shown. The filter element 154 again includes a rather cubical or cuboid filter frame 118 with an inlet opening 126 on one of its frame sides to be attached to a filter wall 108 (see FIGS. 33 and 34). Within the filter frame 118 a filter medium 128 is located as a filter media packet 132. The filter frame 118 also constitutes the front-side, the upper side, the lower side and the back-side of the filter element 154 holding the filter medium 128 therebetween in a rather large v-form in cross-sectional view (FIG. 27). The filter element 154 is to be mounted to a corresponding filter wall 108 as a downstream version filter, i.e. the v-form of the v-shaped filter medium 128 will be directed to the downstream or clean gas/clean side 124 when the filter element 154 is finally mounted at the filter wall 108 (see FIGS. 34 and 37). Therefore, the filter element 154 includes two outlet openings 127 on its side surfaces directed to the clean side 124.

On the rectangular close edge area 134 of the filter frames 118 of the filter element 154 a seal 120 is provided on its upper and lower horizontal edge, each in the form of a linear gasket 166. The gaskets 166 further have a gasket overlap 158 on each of their horizontal ends, the gasket overlap 158 protruding over the closed edge area 134 of the flange portion 130 of the filter frame 118.

Figure 34:
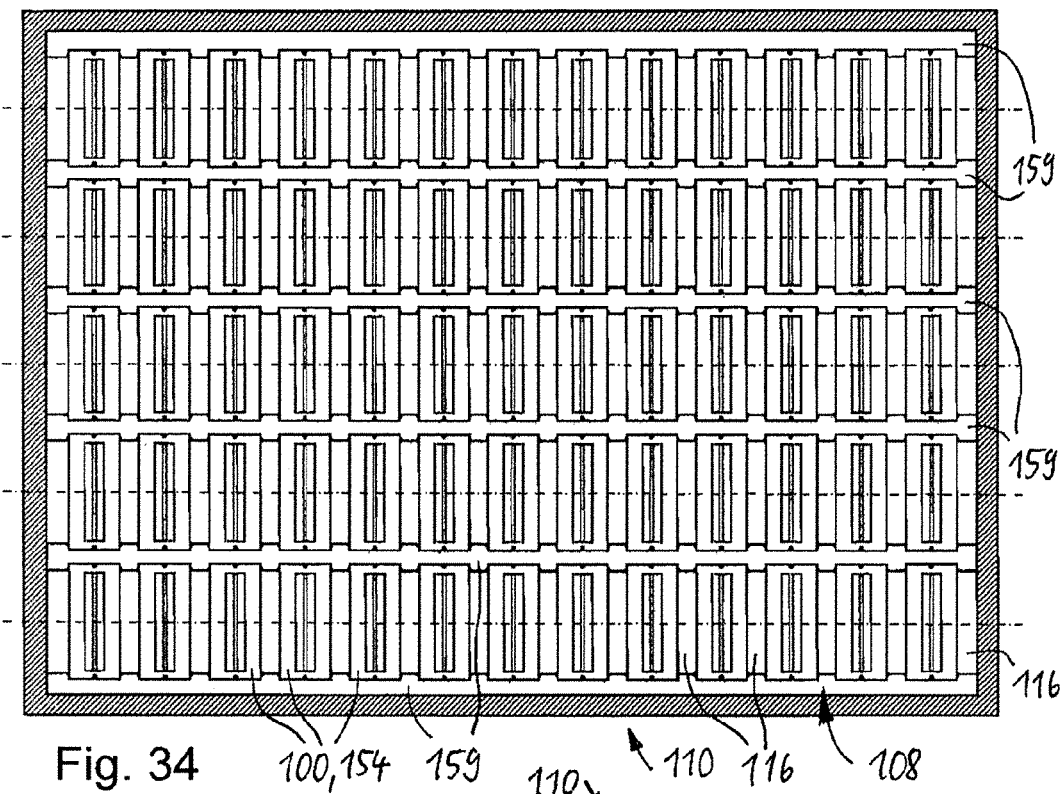
FIG. 34 is a front view of the filter housing of FIG. 33 with filter elements according to FIGS. 27 to 29 installed onto the filter wall.

Furthermore, the closed edge area 134 provides a positioning hole 160 in the middle of its upper and lower edges. The positioning hole 160 serving as a positioning means, when the filter element 154 is mounted to a respective filter wall 108 as it is depicted in FIG. 34.

Figure 35:
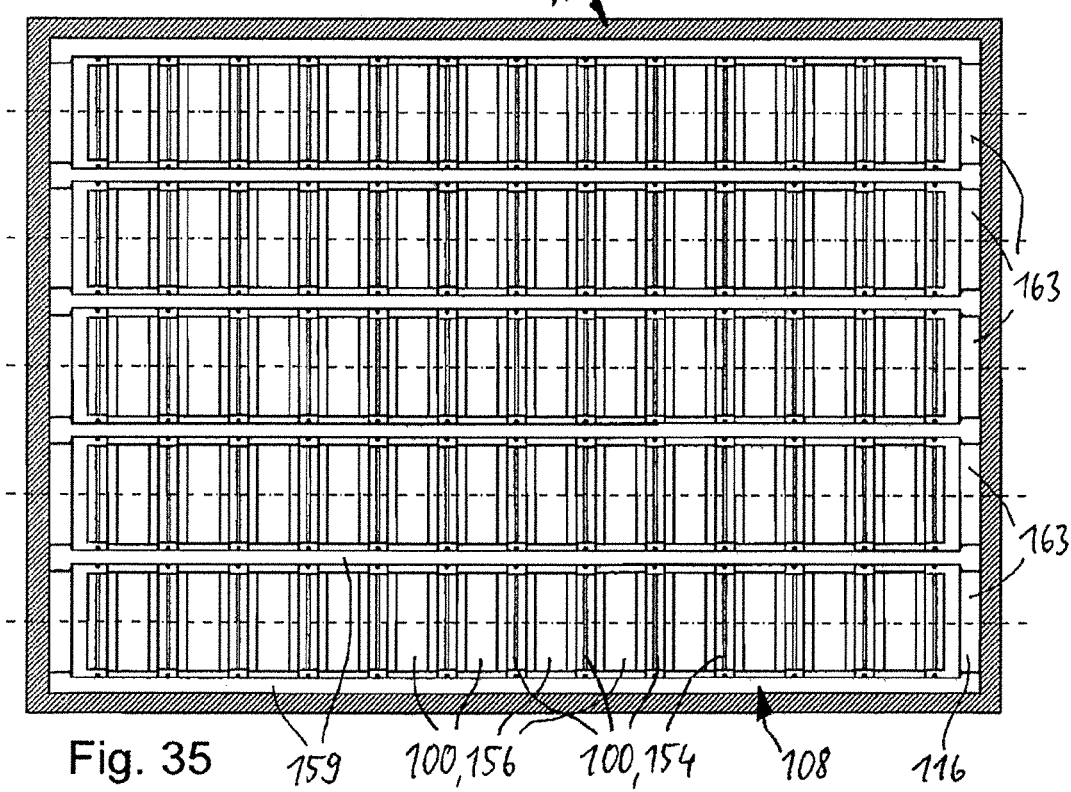
FIG. 35 is a front view of the filter housing of FIG. 34 with filter elements according to FIGS. 30 to 32 installed onto the filter wall.
Figure 36:
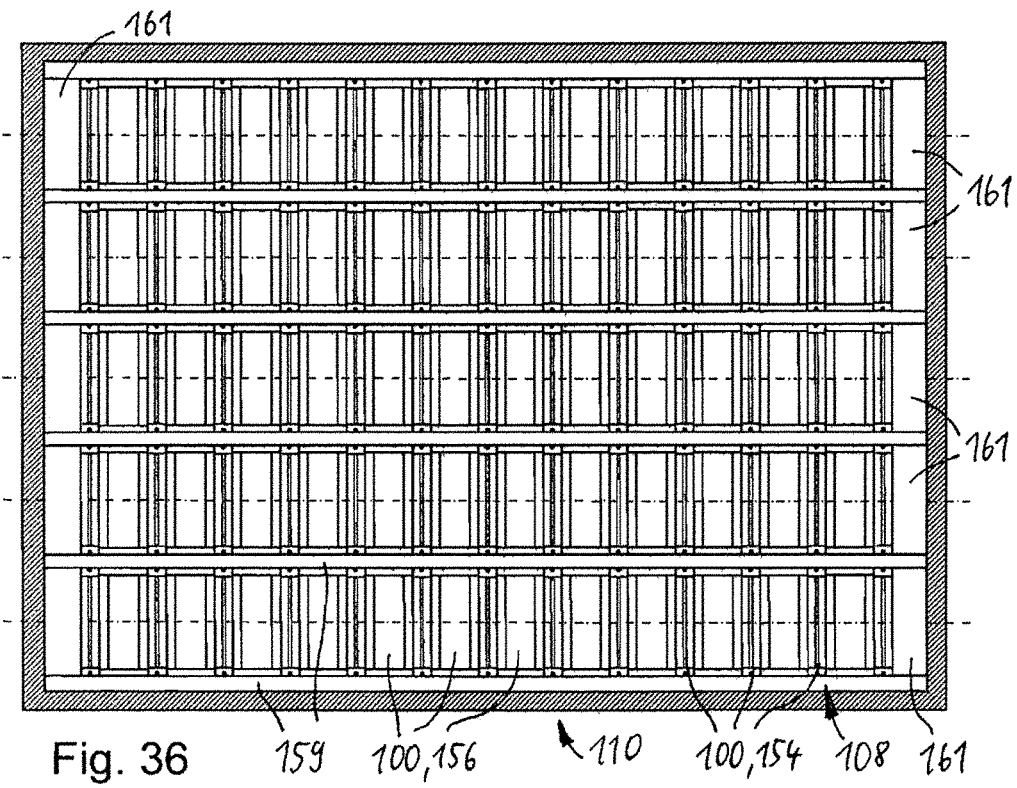
FIG. 36 is a front view of the filter housing of FIG. 35 with side closures installed onto the filter wall.

FIGS. 30 to 32 show a (second) v-shaped filter element 156 of a type B. This type-B filter element 156 also includes a filter frame 118 and a v-shaded filter medium 128 located therein. In contrast to the filter element 154 of type A the filter element 156 of type B is characterised by the filter medium 128 being installed reversely compared to the filter element 154 of type A (viewed in flow direction). In other words, the filter element 156 is to be mounted to the filter wall 108 as an upstream version, i.e. the v-form of the v-shaped filter medium 128 will be directed to the upstream or raw gas/dirty side 122 when the filter element 154 is finally mounted at the filter wall 108 (see FIGS. 35 to 37).

Similar to the filter element 154 the filter element 156 provides inlets and outlets, however here in the form of two inlet openings 126 directed to the dirty side 122 and one outlet opening 127 directed to the clean side 124. The outlet opening 127 forms the center of a rectangular flange portion 130 which is partially stepped by means of a protrusion 157 on its upper and lower rims.

On the rectangular close edge area 134 of the flange portion 130 of the filter frames 118 of the filter element 156 a seal 120 is provided on its upper and lower horizontal edge and on its vertical left and right edges, each in the form of a linear gasket 168. Thus, the seal 120 surrounds the closed edge area 134.

In FIG. 33 the filter wall 108 for mounting the filter elements 154 and 156 is shown. This filter wall 108 includes horizontally directed support beams or holding beams 159 which extend from one side of the corresponding filter house 110 and its filter wall 108 to the other side. The holding beams 159 thus presenting horizontal rows at which filter elements 154 and 156 can be mounted side by side in an alternating manner.

As can be seen in FIG. 34, at first the filter elements 154 are mounted to the holding beams 159 on the dirty side 122 of the holding beams, the filter media packets 132 thereby being directed to and located in the clean side 124 of the filter house 110. As they are mounted, the filter elements 154 are positioned by means of their positioning holes 160 at corresponding positioning pins 162, which are provided at each of the holding beams 159.

Thereafter, the filter elements 156 are mounted to the filter wall 108, each filter element 156 being positioned between two neighboured filter elements 154. The filter elements 156 are again mounted to the dirty side 122 of the holding beams 159, however, the filter media packets 132 of the filter elements 156 being directed to and located in the dirty side 122, too.

After having mounted the filter elements 156, the filter wall 108 is finally closed by means of side closures 161 (see FIG. 36), which are attached to the left and right side portions of each of the rows between two holding beams 159 in order to overlap a tolerance space 163 up to the filter wall 108.

Figure 38:
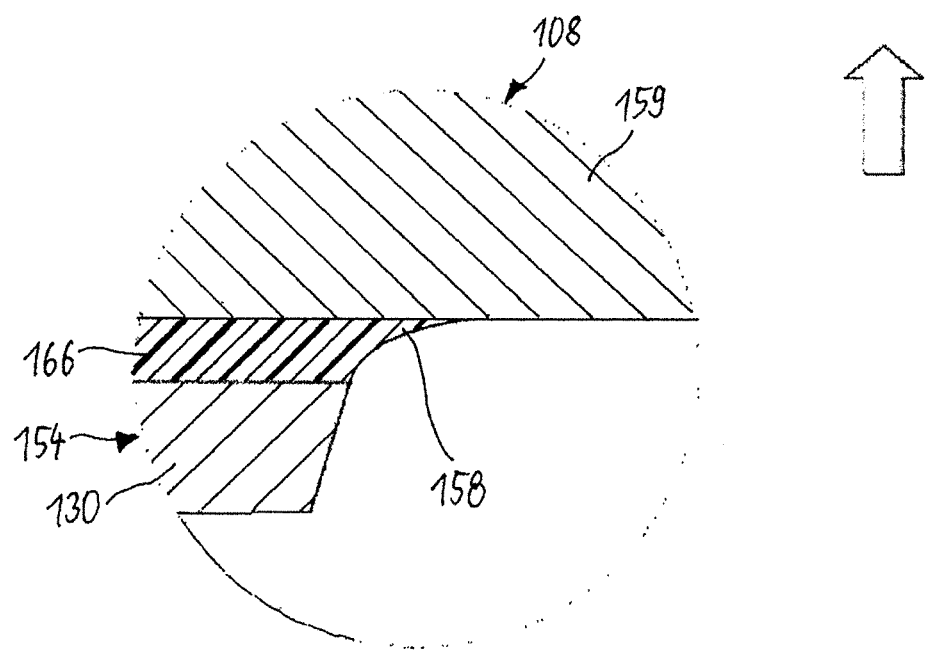
FIG. 38 is a detailed view in section of a sealing arrangement of a filter element at the filter wall as shown in FIG. 34.
Figure 39:
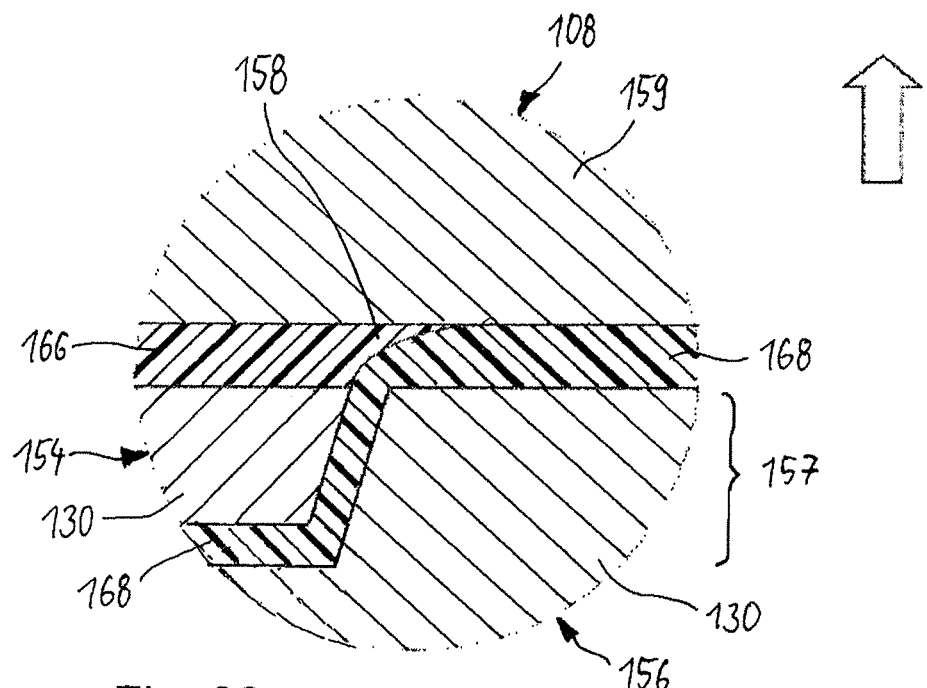
FIG. 39 is a detailed view of the sealing arrangement of FIG. 38 of both types of filter elements at the filter wall as shown in FIG. 35.

Referring to FIGS. 38 and 39 the sealing arrangement of the v-shaped filter elements 154 and 156 of types A and B at the holding beams 159 of the filter wall 108 is depicted. As can be seen, the gasket overlap 158 of the filter elements 154 helps to seal against the bordering gasket 168 of the protrusion 157 of the filter element 156 lying beside.

LIST OF REFERENCE NUMBERS 100 filter
102 type A cartridge filter
104 type B cartridge filter
106 v-shaped filter element 108 filter wall or partition wall
110 filter house of flow channel
112 raw gas/dirty area
114 clean gas/clean area
116 opening of filter wall
118 filter frame
120 seal
122 raw gas/dirty side
124 clean gas/clean side
126 inlet opening in filter frame
127 outlet opening in filter frame
128 filter medium
129 filter edge
130 flange portion
132 filter media packet
134 closed edge area of flange portion
136 horizontal row
138 vertical row
140 flow direction
142 wall of filter house
144 access door
146 inflow opening
148 outflow opening
150 adapter plate
151 front mounting surface
152 opening within adapter plate
153 rear mounting surface
154 filter element (v-shaped), downstream version
155 closed edge area of adapter plate
156 filter element (v-shaped), upstream version
157 protrusion at flange portion
158 gasket overlap
159 holding beam
160 positioning hole
161 side closure
162 positioning pin
163 tolerance space
166 gasket of downstream filter
168 gasket of upstream filter

The invention claimed is:

1. A filtration system for the cleaning intake air of a gas turbine, comprising: a flow channel (110) surrounded by walls (142) with an inflow opening (146) and an outflow opening (148), a partition wall (108) positioned between the inflow opening (146) and the outflow opening (148) and limited by the walls (142) of the flow channel (110) with at least two openings (116) between a dirty side (122) and a clean side (124), and at least two filters (100) for the cleaning a fluid that flows through the flow channel (110), the at least two filters including at least one first filter (100) mounted at a first opening (116) on the dirty side (122) of the partition wall (108) and at least one second filter (100) at a second opening (116) on the clean side (124) of the partition wall (108) and wherein frames (118) of the first and the second filters (100) overlap at least partially in one direction largely vertically to the partition wall (108).

2. The filtration system of claim 1, wherein an area in which the frames (118) of the first and the second filters (100) overlap in one direction largely vertically to the partition wall (108) amounts to at least 5% of an overall projected area of filtration at the partition wall (108).

3. The filtration system of claim 1, wherein the filters (100) are arranged in at least one row (136) at the partition wall (108) and the filter elements (100) of the one row (136) are alternately affixed to the dirty side (122) and the clean side (124) of the partition wall (108).

4. A method for cleaning the intake air of a gas turbine by means of a flow channel (110) surrounded by walls (142) with an inflow opening (146) and an outflow opening (148), a partition wall (108) which is positioned between the inflow opening (146) and the outflow opening (148) and limited by the walls (142) of the flow channel (110) with at least two openings (116) between a dirty side (122) and a clean side (124) the method comprising installing at least one first filter (100) at a first opening (116) on the dirty side (122) of the partition wall (108) and installing at least one second filter element (100) at a second opening (116) on the clean side (124) of the partition wall (108) for cleaning a flowing fluid and wherein frames (118) of the first and the second filters (100) are installed in one direction largely vertically to the partition wall (108) so that they overlap at least partially.

5. The method of claim 4, wherein frames (118) of the first and the second filters (100) overlap in one direction largely vertically to the partition wall (108) by at least 5% of an overall projected area of filtration at the partition wall (108).

6. The method of claim 4, further comprising arranging the filters (100) in at least one row (136) at the partition wall (108) so that the filters (100) of the one row (136) are alternately affixed to the dirty side (122) and the clean side (124) of the partition wall (108).

* * * * *